(12) United States Patent
Ciuperca

(10) Patent No.: US 12,552,724 B2
(45) Date of Patent: Feb. 17, 2026

(54) CARBON SEQUESTRATION USING HYALOCLASTITE, VOLCANIC ASH AND PUMICE POZZOLAN, CEMENT AND CONCRETE USING SAME AND METHOD OF MAKING AND USING SAME

(71) Applicant: Romeo Ilarian Ciuperca, Atlanta, GA (US)

(72) Inventor: Romeo Ilarian Ciuperca, Atlanta, GA (US)

(*) Notice: Subject to any disclaimer, the term of this patent is extended or adjusted under 35 U.S.C. 154(b) by 76 days.

(21) Appl. No.: 18/423,001

(22) Filed: Jan. 25, 2024

(65) Prior Publication Data

US 2024/0208875 A1    Jun. 27, 2024

Related U.S. Application Data

(63) Continuation of application No. 18/064,898, filed on Dec. 12, 2022, now Pat. No. 11,884,602.

(51) Int. Cl.
| | | |
|---|---|---|
| *C04B 40/02* | (2006.01) | |
| *B01D 53/62* | (2006.01) | |
| *C04B 7/02* | (2006.01) | |
| *C04B 7/52* | (2006.01) | |
| *C04B 14/14* | (2006.01) | |
| *C04B 28/04* | (2006.01) | |
| *C04B 28/06* | (2006.01) | |

(52) U.S. Cl.
CPC ............ *C04B 40/0231* (2013.01); *C04B 7/02* (2013.01); *C04B 7/522* (2013.01); *C04B 28/04* (2013.01); *C04B 28/06* (2013.01)

(58) Field of Classification Search
None
See application file for complete search history.

(56) References Cited

U.S. PATENT DOCUMENTS

| | | |
|---|---|---|
| 7,749,476 B2 | 7/2010 | Constantz |
| 7,754,169 B2 | 7/2010 | Constantz |
| 8,470,275 B2 | 6/2013 | Constantz |
| 9,822,037 B1 | 11/2017 | Ciuperca |
| 10,246,379 B2 | 4/2019 | Niven |
| 10,350,787 B2 | 7/2019 | Forgeron |
| 10,570,064 B2 | 2/2020 | Monkman |
| 10,654,191 B2 | 5/2020 | Niven |
| 11,884,602 B1 | 1/2024 | Ciuperca |
| 2020/0165170 A1 | 5/2020 | Niven |
| 2020/0223760 A1 | 7/2020 | Monkman |

(Continued)

OTHER PUBLICATIONS

U.S. Appl. No. 18/416,240, filed Jan. 18, 2024.

(Continued)

*Primary Examiner* — Daniel Berns
(74) *Attorney, Agent, or Firm* — Robert E. Richards

(57) ABSTRACT

The invention comprises a method of sequestering carbon dioxide. The method comprises delivering hyaloclastite, a volcanic glass or pumice to a mill capable of reducing the particle size of the hyaloclastite, a volcanic glass or pumice; processing the hyaloclastite, a volcanic glass or pumice in the mill so that the processed hyaloclastite, a volcanic glass or pumice has a volume-based mean particle size of less than or equal to 40 μm; and exposing the hyaloclastite, a volcanic glass or pumice to carbon dioxide in gaseous, liquid or solid form during or after the particle reduction process.

14 Claims, 1 Drawing Sheet

(56) References Cited

U.S. PATENT DOCUMENTS

2021/0002171 A1* 1/2021 Ciuperca ................ C04B 12/04
2022/0065527 A1 3/2022 Forgeron et al.
2022/0194852 A1 6/2022 Thomas
2022/0339576 A1 10/2022 Bergur
2022/0340488 A1 10/2022 Bullerjahn
2022/0364441 A1 11/2022 Nagra

OTHER PUBLICATIONS

U.S. Appl. No. 18/588,915, filed Feb. 27, 2024.
U.S. Appl. No. 18/612,108, filed Mar. 21, 2024.
U.S. Appl. No. 18/643,867, filed Apr. 23, 2024.
U.S. Appl. No. 18/643,926, filed Apr. 23, 2024.
U.S. Appl. No. 18/495,435, filed Oct. 26, 2023.
U.S. Appl. No. 18/421,638, filed Jan. 24, 2024.

* cited by examiner

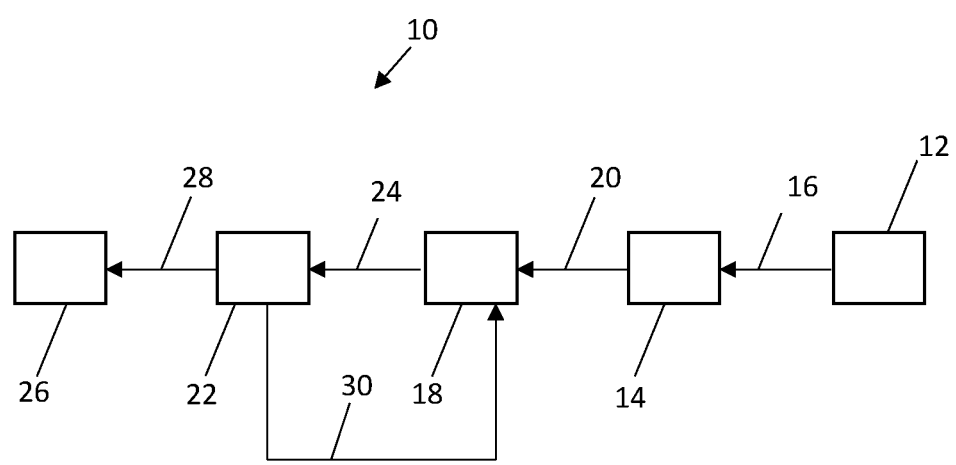

US 12,552,724 B2

CARBON SEQUESTRATION USING HYALOCLASTITE, VOLCANIC ASH AND PUMICE POZZOLAN, CEMENT AND CONCRETE USING SAME AND METHOD OF MAKING AND USING SAME

CROSS-REFERENCE TO RELATED APPLICATIONS

This application is a continuation of Ser. No. 18/064,898 filed Dec. 12, 2022, now U.S. Pat. No. 11,884,602.

FIELD OF THE INVENTION

The present invention generally relates to carbon (carbon dioxide) sequestration by combining carbon dioxide and a hyaloclastite, volcanic ash or pumice natural pozzolan with a basaltic or intermediate chemistry. The present invention generally relates to carbon dioxide sequestration by adding carbon dioxide into the process of manufacturing a natural pozzolan, as well as the manufacturing of a blended cement mix that includes a natural pozzolan with a basaltic or intermediate chemistry. More particularly, the present invention relates to carbon sequestration by injection (i.e.; combining, addition, blending, exposure or otherwise mixing) into a cementitious material containing hyaloclastite, volcanic ash or pumice with a basaltic or intermediate chemistry. The present invention further relates to carbon sequestration by injection into concrete or mortar containing hyaloclastite, volcanic ash or pumice with a basaltic or intermediate chemistry or into a cementitious material that contains hyaloclastite, volcanic ash or pumice with a basaltic or intermediate chemistry. The present invention also relates to a method of carbon sequestration by injection into a hyaloclastite, volcanic ash or pumice-based cementitious material. The present invention further relates to carbon sequestration by injection into a concrete mix containing a hydraulic cement and a hyaloclastite volcanic ash or pumice-based pozzolan with a basaltic or intermediate chemistry by injecting carbon dioxide into the mix, wherein the $CO_2$ will chemically react with uncarbonated calcium, magnesium and the like in the pozzolan and cement and result in calcium carbonate and other carbonate compounds thereby binding the carbon in the cementitious material. The present invention further relates to a method of mixing $CO_2$ into concrete or mortar with portland cement, portland limestone cement, slag cement, lime, hydrated lime or quick lime (CaO) and a hyaloclastite, volcanic ash or pumice-based pozzolan with a basaltic or intermediate chemistry, which results in a chemical reaction of carbonate compounds that sequester $CO_2$ in concrete. The present invention also relates to a method of injecting $CO_2$ into concrete comprising a cementitious material based on hyaloclastite, volcanic ash or pumice with a basaltic or intermediate chemistry activated by a hydroxyl group (e.g., a compound having a reactive hydroxyl group such as CaOH, NaOH, KOH). In addition, the present invention relates to a method of carbon sequestration comprising a hyaloclastite, volcanic ash or pumice-based pozzolan or a hyaloclastite, volcanic ash or pumice-based cementitious material with a basaltic or intermediate chemistry either activated by portland cement, limestone portland cement, slag cement, lime or a reactive hydroxyl group. This present invention also relates to manufacturing of a pozzolan from a natural mineral with a basaltic or intermediate chemistry that contains uncarbonated CaO and optionally one or more uncarbonated compounds, such as MgO, FeO, $K_2O$, $Na_2O$, by injecting $CO_2$ during the manufacturing process, such as during grinding, or blending $CO_2$ at an earlier or later processing stage or at all of those stages. The present invention also relates to the manufacturing of a pozzolan from a mineral with a basaltic or intermediate chemistry and adding an organic grinding aid made of a protein, such as a soy protein, and injecting or adding carbon dioxide to the manufacturing process.

BACKGROUND OF THE INVENTION

Modern concrete is composed of one or more hydraulic cements, coarse aggregates, and fine aggregates. Optionally, modern concrete can include other cementitious materials, inert fillers, property modifying admixtures and coloring agents. The hydraulic cement is typically portland cement. Other cementitious materials include fly ash, slag cement and other known natural pozzolanic materials. The term "pozzolan" is defined in ACI 116R as, " . . . a siliceous or siliceous and aluminous material, which in itself possesses little or no cementitious value but will, in finely divided form and in the presence of moisture, chemically react with calcium hydroxide at ordinary temperatures to form compounds possessing cementitious properties."

Portland cement is the most commonly used hydraulic cement in use around the world today. Portland cement is typically made from limestone. Concrete or mortar made with portland cement sets relatively quickly and gains relatively high compressive strength in a relatively short time. Although significant improvements have been made to the process and efficiency of portland cement manufacturing, it is still a relatively expensive and highly polluting industrial process. The cement manufacture process generates significant amount of $CO_2$, in some cases up to 800 kg per ton of portland cement. Most of the $CO_2$ is released during clinker manufacture where the limestone calcination process (calcium carbonate) releases $CO_2$ to create clinker.

The portland cement industry has been under pressure to reduce the amount of $CO_2$ emissions per ton of cement produced. One way to reduce the carbon footprint of cement is to reduce the clinker factor from the total cement content. Historically, portland cement has used ground limestone to reduce the clinker factor. The ground limestone percentage varies anywhere from 5-35% based on different countries and applications. Ground limestone works as an inert filler and does not have any cementitious or pozzolanic properties. Another way to reduce the carbon footprint and clinker factor is to replace clinker with slag cement in various percentage depending of the jurisdiction and the application. Another method to reduce the clinker factor is to substitute clinker with a pozzolan. Historically, fly ash was used in various percentages alongside clinker of portland cement depending on the jurisdiction and application and varied from 5%-80%. However, due to many coal power plant closures, the fly ash market has experienced significant shortages which increased demand for other types and sources of pozzolans. Natural pozzolans are currently in greater demand to replace fly ash either in the portland cement types or in concrete.

Another way to reduce the carbon footprint of cement manufacture is to capture a portion of the $CO_2$ gas released during the calcining process. This requires significant investments and changes in the calcining and clinker manufacturing processes. The portland cement industry is slowly adapting these new technologies to existing plants. Capturing $CO_2$ is an important step in the reduction of the $CO_2$; however, it presents its own challenges. Once $CO_2$ is captured, it then needs to be stored and sequestered into a permanent form such that the $CO_2$ is not significantly released back into the atmosphere. One of the biggest challenges at the moment is what to do with the $CO_2$ captured from portland cement manufacture, as well as from many other industrial processes.

Fly ash is a by-product of the combustion of pulverized coal in electric power generation plants. When the pulverized coal is ignited in a combustion chamber, the carbon and volatile materials are burned off. When mixed with lime and water, fly ash forms a compound similar to portland cement. Two classifications of fly ash are produced according to the type of coal from which the fly ash is derived. Class F fly ash is normally produced from burning anthracite or bituminous coal that meets applicable requirements. This class of fly ash has pozzolanic properties and will have minimum amounts of silica dioxide, aluminum oxide and iron oxide of 70%. Class F fly ash is generally used in hydraulic cement at dosage rates of 15% to 30% by weight, with the balance being portland cement. Class C fly ash is normally produced from lignite or subbituminous coal that meets applicable requirements. This class of fly ash, in addition to pozzolanic properties, also has some cementitious properties. Class C fly ash is used in hydraulic cement at dosage rates of 15% to 40% by weight, with the balance being portland cement.

Historically, the U.S. concrete industry has used an average of 15 million tons of fly ash at an average portland cement replacement ratio of approximately 16% by weight. Since fly ash is a by-product from the electric power generating industry, the variable properties of fly ash have always been a major concern to the end users in the concrete industry. However, the closure of many coal-fired power plants, and many more if not all coal burning power plants set to close, has resulted in less availability of fly ash, and the concrete industry is facing a dramatic shortage of a familiar pozzolan. As a result, there is an ever-greater demand for suitable natural pozzolans to substitute clinker as a means to reduce the clinker factor.

Known natural pozzolans can be used in concrete to replace the growing shortage of fly ash. However, known natural pozzolan deposits are limited and generally are far from construction markets. Natural pozzolans can be raw or processed. ASTM C-618 defined Class N natural pozzolans as, "Raw or calcined natural pozzolans that comply with the applicable requirements for the class as given herein, such as some diatomaceous earth; opaline chert and shales; tuffs and volcanic ashes or pumicites, any of which may or may not be processed by calcination; and various materials requiring calcination to induce satisfactory properties, such as some clays and shales."

Other known natural pozzolans include Santorin earth, Pozzolana, Trachyte, Rhenish trass, Gaize, volcanic tuffs, pumicites, diatomaceous earth, and opaline shales, rice husk ash and metakaolin. Santorin earth is produced from a natural deposit of volcanic ash of dacitic composition on the island of Thera in the Agean Sea, also known as Santorin, which was formed about 1600-1500 B.C. after a tremendous explosive volcanic eruption (Marinatos 1972). Pozzolana is produced from a deposit of pumice ash or tuff comprised of trachyte found near Naples and Segni in Italy. Pozzolana is a product of an explosive volcanic eruption in 79 A.D. at Mount Vesuvius, which engulfed Herculaneum, Pompeii, and other towns along the bay of Naples. The deposit near Pozzuoli is the source of the term "pozzolan" given to all materials having similar cementitious properties. Similar tuffs of lower silica content have been used for centuries and are found in the vicinity of Rome. In the United States, volcanic tuffs and pumicites, diatomaceous earth, and opaline shales are found principally in Oklahoma, Nevada, Arizona, and California. Rice husk ash ("RHA") is produced from rice husks, which are the shells produced during the dehusking of rice. Rice husks are approximately 50% cellulose, 30% lignin, and 20% silica. Metakaolin ($Al_2O_3$: $2SiO_2$) is a natural pozzolan produced by heating kaolin-containing clays over a temperature range of about 600 to 900° C. (1100 to 1650° F.) above which it recrystallizes, rendering it mullite ($Al_6Si_2O_{13}$) or spinel ($MgAl_2O_4$) and amorphous silica (Murat, Ambroise, and Pera 1985). The reactivity of metakaolin is dependent upon the amount of kaolinite contained in the original clay material. The use of metakaolin as a pozzolanic mineral admixture has been known for many years, but has grown rapidly since approximately 1985.

Natural pozzolans were investigated in this country by Bates, Phillips and Wig as carly as 1908 (Bates, Phillips and Wig 1912) and later by Price (1975), Meissner (1950), Mielenz, Witte, and Glantz (1950), Davis (1950), and others. They showed that concretes containing pozzolanic materials exhibited certain desirable properties such as lower cost, lower temperature rise, and improved workability. According to Price (1975), an example of the first large-scale use of portland-pozzolan cement, composed of equal parts of Portland cement and a rhyolitic pumicite, is the Los Angeles aqueduct in 1910-1912. Natural pozzolans by their very definition have high silica or alumina and silica content either in a raw or calcined form.

Generally, fly ash has the advantage that it can reduce water demand of the cementitious matrix. This reduces plastic shrinkage and allows for better workability. Generally, known natural pozzolans and silica fume increase water demand in the cementitious matrix; in some cases, as high as 110%-115% that of portland cement. Greater water demand creates undesirable concrete properties such as lower strength development and greater plastic shrinkage. It is desired that pozzolans have a water demand that is lower than or equal to portland cement. However, this is an extremely rare occurrence for known natural pozzolans.

The alkali-silica reaction ("ASR"), more commonly known as "concrete cancer", is a reaction that occurs over time in concrete between the highly alkaline cement paste and reactive non-crystalline (amorphous) silica found in many common aggregates, provided there is sufficient moisture present. This reaction causes the expansion of the altered aggregate by the formation of a soluble and viscous gel of sodium silicate ($Na_2SiO_3 \cdot n\ H_2O$, also noted $Na_2H_2SiO_4 \cdot n\ H_2O$, or N—S—H (sodium silicate hydrate), depending on the adopted convention). This hygroscopic gel swells and increases in volume when absorbing water. The swelling gel exerts an expansive pressure inside the siliceous aggregate, causing spalling and loss of strength of the concrete, finally leading to its failure. ASR can cause serious cracking in concrete, resulting in critical structural problems that can even force the demolition of a particular structure.

Historically pozzolanic materials have been selected from minerals and compounds that contain high amounts of amorphous silica and alumina. This is the very definition of a pozzolan as the pozzolanic reaction is for the silica and alumina to react with calcium hydroxide to create more calcium silicate or alumina hydrates. As an example, a natural pozzolan has a chemical composition containing over 65% $SiO_2$ and more generally above 70%, $Al_2O_3$ of generally 10-12% and insignificant to no amounts of CaO, MgO or $Fe_2O_3$ (sometimes denoted FeO). The use of hyaloclastite as a natural pozzolan with basaltic or intermediate chemistry containing 40-65% $SiO_2$, 10-18% $Al_2O_3$, 4-20%

CaO, 3-15% MgO was not known until the hyaloclastite pozzolans were introduced to the market by this inventor (see for example U.S. Pat. No. 9,822,037).

Fundamentally, the cement hydration process creates calcium silicate hydrate that binds the aggregates within the concrete mix and gains strength over time. A byproduct of the cement hydration process is calcium hydroxide. Pozzolans have been selected to contain large amounts of SiO to react with the calcium hydroxide from the cement hydration process to create additional calcium silicate or aluminate hydrate that farther strengthens and densifies the concrete. Additionally, the alumina ($Al_2O_3$) reacts with alkalis to mitigate ASR and creates useful compounds within the concrete matrix over time.

More recently, the concept of injecting $CO_2$ into fresh concrete during the mixing process claims to help cure concrete by a carbonation process. An issue with this process is that portland cement is not lime (CaO) to be carbonated, it is made of a complex matrix, composed of the following: Alite (C3S): tricalcium silicate ($3CaO \cdot SiO_2$), Belite (C2S): dicalcium silicate ($2CaO \cdot SiO_2$), C3A: tricalcium aluminate ($3CaO \cdot Al_2O_3$), and a C4AF: tetra-calcium aluminoferrite ($4CaO \cdot Al_2O_3Fe_2O_3$). A typical example of cement contains 50-70% C3S, 15-30% C2S, 5-10% C3A, 5-15% C4AF, and 3-8% other additives or minerals (such as oxides of calcium and magnesium). It is the hydration of the calcium silicate, aluminate, and aluminoferrite minerals that causes the hardening, or setting, of cement. Portland cement may only contain 1-2% of free lime (CaO) In simple terms the cement hydration process creates calcium silicate or aluminate hydrate and not calcium carbonates.

Portland Cement Association (PCA) defines carbonation as follows: Concrete is a porous material, like a sponge. $CO_2$ is absorbed by any exposed concrete surface and when that $CO_2$ reacts with the calcium hydroxide, the byproduct of cement hydration, it forms a calcium carbonate mineral and the carbon is permanently captured. Carbonation is a naturally occurring process where $CO_2$ in the air reacts with the calcium hydroxide in concrete forming calcium carbonate, a naturally occurring mineral that is a common ingredient in everything from toothpaste to antacids. In addition to passive carbon capture, $CO_2$ can also be injected into fresh concrete or introduced under pressure in chambers containing concrete products as a solution for storing captured carbon. This is a description of conventional portland cement concrete mixes where the calcium hydroxide generated by the cement hydration process is available to react with carbon dioxide and carbonate. The carbonation of portland cement paste and aggregates taking place when injecting $CO_2$ in conventional concrete as described in the CarbonCure patents (U.S. Pat. Nos. 10,246,379; 10,350,787; 10,570,064 and 10,654,191 (the disclosures of which are incorporated herein by reference in their entirety)) is similar to the process described by the PCA and as such is dependent on the calcium hydroxide availability to react with carbon dioxide. These patents describe a process of a concrete mix, using a bag mix from the QuickCrete company. This mix contains portland cement and no pozzolan of any kind. This is an important feature of the specification for the following reasons. The cement hydration process generates calcium hydroxide which can react with carbon dioxide to create a calcium carbonate so long as both the calcium hydroxide and carbon dioxide are present at the same time. The process of carbonation is dependent on the calcium hydroxide, a byproduct of the cement hydration process being available to react with the carbon dioxide. The CarbonCure patents describe mixing carbon dioxide within the concrete mix in the paste at the time of the initial mix when cement, aggregate and water are mixed together. At that point, all of the above form a paste and the carbon dioxide is mixed into the paste. The carbonation process cannot start at the time of mixing or adding carbon dioxide into the mix since the hydration reaction is yet to start and there is no calcium hydroxide present to carbonate. In other words, the carbonation reaction cannot start until after the cement hydration reaction is far along to create sufficient amounts of calcium hydroxide to react with the carbon dioxide. The creation of calcium hydroxide is a relatively slow process; yet, it is a continuous process taking place as long as there is cement hydration taking place. It is known that the cement hydration reaction builds up in the first few days and then gradually slows down over time yet continues for as long as there is moisture available to hydrate cement particles, for months and sometimes for years after the initial concrete mixing. As mentioned above, the primary compound of the cement hydration reaction is creating of calcium silicate or aluminate hydrate with the by-product of this reaction being calcium hydroxide. Therefore, the availability of sufficient amounts of the calcium hydroxide takes time to build up. Calcium hydroxide lacks any usefulness in concrete. However, when adding a pozzolan, the calcium hydroxide reacts with the silica and alumina from the pozzolan to create additional calcium silica hydrate or calcium aluminate hydrate and other similar mineral forms. The pozzolanic reaction is slow to activate due to the slow build-up of calcium hydroxide and this is why a concrete mix with pozzolan replacement of a portion of portland cement but with the same total amount of cementitious material will gain strength slowly over time. The finer the particle size of the pozzolan, the better the pozzolan distribution within the paste, to react with the developing calcium hydroxide, and, therefore, the pozzolanic reaction will proceed faster. However concrete mixes using pozzolans that can provide sufficient amount of silica and alumina continue to gain strength for months and years longer than straight portland cement mixes, far exceeding the properties and strength of the straight portland cement mixes by reacting with the calcium hydroxide over time. It is very important to point out several things in regards to the CarbonCure patents. First, as stated above, the carbonation reaction is based on the assumption that the carbon dioxide reacts with calcium hydroxide to create the calcium carbonate generated by the cement hydration. If the concrete mix is using portland cement and a pozzolan, the calcium hydroxide can and will react with the silica and alumina from the pozzolans and not the carbon dioxide. The finer the particle size of the pozzolan the faster the pozzolanic reaction will take place, and, therefore, deprive the carbon dioxide of the necessary reactants for the carbonation reaction. In other words when using a pozzolan in the concrete mix, the pozzolan and the carbon dioxide have to compete for the slow producing and early on limited amount of calcium hydroxide. A second issue, and perhaps most important, is that carbon dioxide is a gas that is mixed into a highly viscous paste by mechanical mixing. This is a challenging process taking place in a limited amount of time. Historically, a concrete batch plant has a predetermined amount of time for mixing the concrete components. The concrete has to be mixed thoroughly to disperse the water to create a solution or paste that can suspend the aggregate in a uniform way so that the concrete can be transported and placed without separating the aggregate from the paste. Additionally, it is important not to overmix the concrete constituents. Furthermore, in a concrete batch plant economic performance is based on efficient and expeditious mixing of concrete batches and delivering as many of the cycles in a day. With this background, when the CarbonCure patents inject the carbon dioxide into the mix, in practice as a gas, it has to wait until the concrete mix is in a paste form otherwise the carbon dioxide will would not be retained in the mix to any significant extent. To mix in substantial amounts of carbon dioxide into the concrete mix, a substantial amount of mixing is needed. This would take additional time at the batch plant and is counterproductive to the business model of producing as many batches mixed and delivered in a given time period. In addition, if the concrete were mixed with the carbon dioxide for a time longer than the optimal amount, the concrete mix would suffer. Therefore, it is believed that the CarbonCure process results in only a limited amount of carbon dioxide being mixed into the concrete mix at the batch plant. Thus, the CarbonCure process results in a gas suspended in a viscous paste with limited dispersion and in limited amounts. After this process is completed, the concrete mix containing the carbon dioxide is placed into a delivery truck with a rotating drum that will take it to the jobsite for placement. The rotating drum is open to the atmosphere and is likely that during delivery that gaseous carbon dioxide will escape the concrete mix. Once the concrete is delivered and placed into a concrete form or mold, the carbon dioxide has to wait for the cement hydration reaction to create calcium hydroxide to react with. Also, entraining a gas into the concrete mix creates pores that while they help with the freeze thaw performance, it results in an overall concrete strength reduction. This creates limits on the amount of gas that can be placed in a concrete mix. As mentioned above, as the calcium hydroxide develops over time, the carbon dioxide being in a gas form now suspended in a solid, will likely further escape making the carbonation reaction very slow in the beginning and then overtime may come to a halt as more and more carbon dioxide is lost to the atmosphere. This would be the case in a concrete mix using straight portland cement where calcium hydroxide is available to react with carbon dioxide. However, if a concrete mix uses a pozzolan then the limited amount of carbon dioxide has to compete for the calcium hydroxide with the pozzolanic reaction. The likely result is only a relatively small amount of carbonation will take place, if any. According to some estimates, the carbonation of portland cement-based concrete is only around approximately 5-6%. The addition of traditional pozzolans, such as fly ash or metakaolin, or known natural pozzolans to concrete or cement will likely increase the production of additional calcium silicate or aluminate hydrates and not calcium carbonates.

The manufacture of portland cement generates significant amounts of $CO_2$. By some estimates as much as 7% of global $CO_2$ emission can be traced to the manufacture of portland cement. As a result, great emphasis is being placed on the reduction of $CO_2$ from the cement manufacture, such as carbon capture and carbon sequestration. Recently, $CO_2$ has been injected into fresh concrete with a goal of the $CO_2$ reacting with certain components of the concrete mix to absorb or adsorb, the $CO_2$, and. therefore. sequester the $CO_2$ in the fresh concrete. However, the constituents of cement and concrete mixes are poor absorbers of $CO_2$ and most of the injected $CO_2$ is unreacted and potentially lost back into the atmosphere. Fly ash, and other pozzolans in particular, compete for calcium hydroxide in a concrete mix and carbon sequestration in a pozzolan mix is unlikely. The reason is that conventional pozzolans contain relatively large amounts of silica and alumina that when combined with the calcium hydroxide create silicate hydrates and alumino silicate and not carbonates. In other words, traditional pozzolans do not have the proper chemistry; i.e., elements available to react with carbon dioxide to create carbonates. Examples of these would be uncarbonated calcium compounds, such that $CO_2$ can react with the calcium compounds, such as CO, to for $CaCO_3$, and sequester $CO_2$ in the concrete, uncarbonated magnesium, sodium, potassium, iron and the like that can create simple carbonates or crystalline structures that contains $CO_3$.

Therefore, it would be desirable to have a natural pozzolan that in addition to forming calcium silicate hydrate and calcium aluminates, also contain elements that can react with carbon dioxide to create carbonate and sequester $CO_2$. It would also be desirable to have a natural pozzolan that when combined with portland cement produces a concrete with improved physical properties compared to straight portland cement-based concrete.

SUMMARY OF THE INVENTION

The present invention satisfies the foregoing needs by providing a natural pozzolan that that in addition to silica and alumina that can be activated by calcium hydroxide to power the pozzolanic reaction, also contains uncarbonated elements that can react, either directly or indirectly, with $CO_2$ to form various carbonate compounds.

In one disclosed embodiment, the present invention comprises a natural pozzolan with a mean particle size sufficiently small or a surface area sufficiently large and porosity such that when exposed to carbon dioxide, the carbon dioxide is adsorbed on the surface of the pozzolan particle or absorbed by the pozzolan particle.

In one disclosed embodiment, the present invention comprises a natural pozzolan with a chemical composition comprising approximately 40 to approximately 65 percent by weight $SiO_2$, approximately 10 to approximately 18 percent by weight $Al_2O_3$, and approximately 4 to approximately 20 percent by weight CaO and wherein the natural pozzolan has a mean particle size less than or equal to approximately 40 µm such that when exposed to carbon dioxide at least a portion of the CaO reacts with the $CO_2$.

In one disclosed embodiment, the present invention comprises a natural pozzolan with a chemical composition comprising approximately 40 to approximately 65 percent by weight $SiO_2$, approximately 10 to approximately 18 percent by weight $Al_2O_3$, approximately 4 to approximately 20 percent by weight CaO and approximately 3 to approximately 15 percent by weight MgO and wherein the natural pozzolan has a mean particle size less than or equal to approximately 40 µm such that when exposed to carbon dioxide at least a portion of the CaO and MgO reacts with the $CO_2$.

In a disclosed embodiment, the present invention comprises hyaloclastite, volcanic ash or pumice with a basaltic or intermediate chemistry and having a mean particle size sufficiently small or a surface area sufficiently large and porosity such that when exposed to carbon dioxide, the carbon dioxide is adsorbed on the surface of the hyaloclastite, volcanic ash or pumice particles or absorbed by the hyaloclastite particles.

In a disclosed embodiment, the present invention comprises hyaloclastite, volcanic ash or pumice with a basaltic or intermediate chemistry and wherein the hyaloclastite, volcanic ash or pumice has a mean particle size less than or equal to approximately 40 µm such that when exposed to carbon dioxide at least a portion of the $CO_2$ reacts with the hyaloclastite.

In another disclosed embodiment, the present invention comprises a method. The method comprises providing fresh concrete and treating the fresh concrete with carbon dioxide gas, wherein the fresh concrete comprises a hydraulic cement and a natural pozzolan; and wherein the natural pozzolan has a volume-based mean particle size of less than or equal to 40 µm and comprises at least approximately 4 percent by weight uncarbonated CaO.

In another disclosed embodiment, the present invention comprises a method. The method comprises providing fresh concrete and treating the fresh concrete with carbon dioxide gas, wherein the pozzolan comprises approximately 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, and wherein the natural pozzolan has a surface area sufficiently large and porous such that the carbon dioxide gas react with the surface of the natural pozzolan to form a carbonate.

In another disclosed embodiment, the present invention comprises a method. The method comprises providing fresh concrete and treating the fresh concrete with carbon dioxide gas, wherein the fresh concrete comprises a hydraulic cement and a natural pozzolan comprising approximately 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, and wherein the natural pozzolan has a a volume-based mean particle size of less than or equal to 40 µm.

In another disclosed embodiment, the present invention comprises a method. The method comprises delivering a natural pozzolan comprising approximately 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO to a mill suitable for reducing the particle size of the natural pozzolan; processing the natural pozzolan in the mill so that the processed natural pozzolan has a volume-based mean particle size of less than 40 µm and exposing the natural pozzolan to carbon dioxide in gaseous, liquid or solid form during or after the particle reduction process.

In another disclosed embodiment, the present invention comprises a method. The method comprises delivering hyaloclastite, volcanic ash or pumice to a mill suitable for reducing the particle size of the hyaloclastite, volcanic ash or pumice; processing the hyaloclastite volcanic ash or pumice in the mill so that the processed hyaloclastite, volcanic ash or pumice has a volume-based mean particle size of less than 40 µm and exposing the hyaloclastite volcanic ash or pumice to carbon dioxide in gaseous, liquid or solid form during or after the particle reduction process.

In another disclosed embodiment, the present invention comprises a method. The method comprises delivering hyaloclastite, volcanic ash or pumice to a mill suitable for reducing the particle size of the hyaloclastite, volcanic ash or pumice; processing the hyaloclastite, volcanic ash or pumice in the mill so that the processed hyaloclastite, volcanic ash or pumice has a volume-based mean particle size of less than 40 µm and exposing the hyaloclastite, volcanic ash or pumice to carbon dioxide in gaseous, liquid or solid form during or after the particle reduction process.

In another disclosed embodiment, the present invention comprises a method. The method comprises mixing lime, hydrated lime or quick lime and a pozzolan with a chemical composition comprising of 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, wherein the pozzolan has a volume-based mean particle size of less than or equal to approximately 40 µm and exposing the mixture to $CO_2$.

In another disclosed embodiment, the present invention comprises a method. The method comprises mixing lime, hydrated lime or quick lime and hyaloclastite, volcanic ash or pumice having a volume-based mean particle size of less than or equal to approximately 40 µm and exposing the mixture to $CO_2$.

In another disclosed embodiment, the present invention comprises a method. The method comprises mixing lime, hydrated lime or quick lime and hyaloclastite, volcanic ash or pumice having a volume-based mean particle size of less than or equal to approximately 40 µm and exposing the mixture to $CO_2$.

In another disclosed embodiment, the present invention comprises a method. The method comprises mixing a compound having a reactive hydroxyl group and a natural pozzolan with a chemical composition comprising of 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, wherein the natural pozzolan has a volume-based mean particle size of less than or equal to approximately 40 µm and exposing the mixture to $CO_2$.

In another disclosed embodiment, the present invention comprises a method. The method comprises mixing a compound having a reactive hydroxyl group and hyaloclastite, volcanic ash or pumice having a volume-based mean particle size of less than or equal to approximately 40 µm and exposing the mixture to $CO_2$.

In another disclosed embodiment, the present invention comprises a method. The method comprises mixing a protein and a pozzolan with a chemical composition comprising of 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, wherein the pozzolan has a volume-based mean particle size of less than or equal to approximately 40 µm and exposing the mixture to $CO_2$.

In another disclosed embodiment, the present invention comprises a method. The method comprises mixing a protein and hyaloclastite, volcanic ash or pumice having a volume-based mean particle size of less than or equal to approximately 40 µm and exposing the mixture to $CO_2$.

In another disclosed embodiment, the present invention comprises a method. The method comprises mixing a hydraulic cement, a protein and a pozzolan with a chemical composition comprising of 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, wherein the pozzolan has a volume-based mean particle size of less than or equal to approximately 40 µm and exposing the mixture to $CO_2$.

In another disclosed embodiment, the present invention comprises a method. The method comprises mixing a hydraulic cement, a protein and hyaloclastite, volcanic ash or pumice having a volume-based mean particle size of less than or equal to approximately 40 μm and exposing the mixture to $CO_2$.

In another disclosed embodiment, the present invention comprises a method. The method comprises mixing an aqueous alkaline activating solution suitable for forming a geopolymer and a natural pozzolan with a chemical composition comprising of 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, wherein the natural pozzolan has a volume-based mean particle size of less than or equal to approximately 40 μm and exposing the mixture to $CO_2$.

In another disclosed embodiment, the present invention comprises a method. The method comprises mixing an aqueous alkaline activating solution suitable for forming a geopolymer and hyaloclastite, volcanic ash or pumice having a volume-based mean particle size of less than or equal to approximately 40 μm and exposing the mixture to $CO_2$.

In another disclosed embodiment, the present invention comprises a method. The method comprises combining a carbon nano material having $CO_2$ adsorbed thereon to a mixture of a hydraulic cement and a natural pozzolan with a chemical composition comprising of 40 to approximately 65% by weight $SiO_2$, approximately 10 to approximately 18% by weight $Al_2O_3$, approximately 4 to approximately 18% by weight $Fe_2O_3$, approximately 4 to approximately 20% by weight CaO, approximately 3 to approximately 15% by weight MgO, wherein the natural pozzolan has a volume-based mean particle size of less than or equal to approximately 40 μm.

In another disclosed embodiment, the present invention comprises a method. The method comprises combining a carbon nano material having $CO_2$ adsorbed thereon to a mixture of a hydraulic cement and hyaloclastite having a volume-based mean particle size of less than or equal to approximately 40 μm.

Accordingly, it is an object of the present invention to provide an improved cementitious composition that can sequester $CO_2$.

Another object of the present invention is to provide an improved natural pozzolan that can sequester $CO_2$.

Another object of the present invention is to provide an improved concrete or mortar that can sequester $CO_2$.

Another object of the present invention is to provide a viable and cost-effective way to sequester significant amount of $CO_2$ within concrete or mortar.

A further object of the present invention is to provide an improved supplementary cementitious material that can sequester $CO_2$.

Yet another object of the present invention is to provide a natural pozzolan with a lower water demand than portland cement that can sequester $CO_2$.

Another object of the present invention is to provide a natural pozzolan with a specific gravity approximately equal to that of portland cement so that it can replace portland cement on a one-to-one basis and can also sequester $CO_2$.

Another object of the present invention is to provide a natural pozzolan that reduces ASR in concrete and also can sequester $CO_2$.

These and other objects, features and advantages of the present invention will become apparent after a review of the following detailed description of the disclosed embodiments and the appended drawing and claims.

BRIEF DESCRIPTION OF THE DRAWINGS

FIG. 1 is a flow diagram of a disclosed embodiment of a pozzolan processing plant in accordance with the present invention.

DETAILED DESCRIPTION OF THE DISCLOSED EMBODIMENTS

Hyaloclastite is a hydrated tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial ice field. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions in particular associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

Sometimes a subglacial or subaquatic eruption may produce a release of volcanic ashes that are ejected into the atmosphere which can then land back on the ground. At times a fine volcanic particle size may be called a "volcanic ash" by different professionals in the geological field even though the ash definition may be debatable. It is also possible that a subglacial or subaquatic eruption may have been produced by a magma with high volume of gas entrapped in the lava. The high volume of gas exsolution may create a mineral with very high porosity or vesicular structure and bulk density similar to scoria or pumice.

Natural pozzolans, such as hyaloclastite, volcanic ash, or pumice, can be classified based on the amount of silica content as: basaltic (less than 53% by weight $SiO_2$), intermediate (approximately 53-57% by weight $SiO_2$), or silicic such as andesitic (approximately 57-63% by weight $SiO_2$), dacitic (approximately 63-69% by weight $SiO_2$), or rhyolitic (greater than 69% by weight $SiO_2$). However, for the purpose of this invention the basaltic range starts at 40% $SiO_2$ and the andesitic range ends at 65% $SiO_2$.

Basaltic hyaloclastite, volcanic ash or pumice contains generally 40% to 53% by weight silica ($SiO_2$) contained in an amorphous or crystalline form or a combination thereof essentially calcic plagioclase feldspar and pyroxene (usually Augite), with or without olivine. In addition to silica, basaltic hyaloclastite, volcanic ash or pumice generally comprises approximately 10 to approximately 18 percent by weight $Fe_2O_3$, approximately 6 to approximately 18 percent by weight CaO, approximately 5 to approximately 15 percent by weight MgO and other elements in various percentages. Intermediate basaltic hyaloclastite, volcanic ash or pumice generally comprises approximately 53 to approximately 57 percent by weight silica ($SiO_2$) content. In addition to silica, intermediate basaltic hyaloclastite, volcanic ash or pumice generally comprises approximately 5 to approximately 10 percent by weight $Fe_2O_3$, approximately 6 to approximately 10 percent by weight CaO, approximately 3 to approximately 10 percent by weight MgO and other elements in various percentages. Basaltic hyaloclastite, volcanic ash or pumice may also contain quartz, hornblende, biotite, hypersthene (an orthopyroxene) and feldspathoids. The average specific density of basaltic hyaloclastite, volcanic ash or pumice is approximately 2.7-3.0 gm/cm$^3$.

Andesite is an abundant igneous (volcanic) rock of intermediate composition, with aphanitic to porphyritic texture. In a general sense, it is an intermediate type between basalt and dacite. Andesitic hyaloclastite, volcanic ash or pumice ranges from approximately 57 to approximately 63 percent by weight silicon dioxide ($SiO_2$). For the purpose of this invention, we extend the andesite $SiO_2$ content up to 65%. In addition to silica, andesitic hyaloclastite, volcanic ash or pumice generally comprises approximately 5 to approximately 10 percent by weight $Fe_2O_3$, approximately 5 to approximately 10 percent by weight CaO, approximately 3 to approximately 8 percent by weight MgO and other elements in various percentages.

Dacite is an igneous, volcanic rock with an aphanitic to porphyritic texture and is intermediate in composition between andesite and rhyolite and ranges from approximately 63% to approximately 69% by weight silicon dioxide ($SiO_2$). In addition to silica, dacite generally contains approximately 4 to approximately 8% by weight $Fe_2O_3$, approximately 3 to approximately 8% by weight CaO, approximately 1 to approximately 6% by weight MgO and other elements in various percentages. It consists mostly of plagioclase feldspar with biotite, hornblende, and pyroxene (augite and/or enstatite). It has quartz as rounded, corroded phenocrysts, or as an element of the ground-mass. The plagioclase ranges from oligoclase to andesine and labradorite. Sanidine occurs, although in small proportions, in some dacites, and when abundant gives rise to rocks that form transitions to the rhyolites. The groundmass of these rocks is composed of plagioclase and quartz.

Rhyolite is an igneous (volcanic) rock of felsic (silica-rich) composition, typically greater than 69% by weight $SiO_2$. In addition to silica, rhyolite generally contains 0 to approximately 5% by weight $Fe_2O_3$, approximately 0.5 to approximately 6% by weight CaO, 0 to approximately 2% by weight MgO and other elements in various percentages. It may have a texture from glassy to aphanitic to porphyritic. The mineral assemblage is usually quartz, sanidine and plagioclase. Biotite and hornblende are common accessory minerals.

The different types of pozzolans contain varying amounts of uncarbonated elements; i.e., Ca, Mg, K, Na and Fe, that in the presence of $CO_2$ may react to form a carbonate, and, therefore, sequester carbon dioxide. The presence of carbonatable elements can by determined by chemical analysis of oxides. The sum of carbonatable elements is inversely proportional to the $SiO_2$ content. In other words, the higher the silica content the lower the total amount of carbonatable elements which means that a pozzolan with the lowest silica content will contain the highest amount of uncarbonated Ca and the most amount of one or more uncarbonated elements of Mg, K, Na, Fe, etc. As an example, hyaloclastite, volcanic ash or pumice classified based on the amount of silica content comprises the following elements: basaltic hyaloclastite, volcanic ash or pumice (less than approximately 53% by weight $SiO_2$) contains CaO of approximately 6 to approximately 18% by weight, MgO approximately 5 to approximately 15% by weight, $K_2O$ approximately 1% by weight, $Na_2O$ approximately 3% by weight and $Fe_2O_3$ approximately 10 to approximately 18% by weight; intermediate hyaloclastite, volcanic ash or pumice (approximately. 53 to approximately 57% by weight $SiO_2$) comprises CaO of approximately 6 to approximately 10% by weight, MgO approximately 3 to approximately 10% by weight, $K_2O$ approximately 1% by weight, $Na_2O$ approximately 3% by weight and $Fe_2O_3$ approximately 5 to approximately 10% by weight; or silicic such as andesitic hyaloclastite, volcanic ash or pumice (approximately 57 to approximately 65% by weight $SiO_2$) comprises CaO of approximately 6 to approximately 18% by weight, MgO approximately 5 to approximately 15% by weight, $K_2O$ approximately 1% by weight, $Na_2O$ approximately 3% by weight and $Fe_2O_3$ approximately 5 to approximately 10% by weight; dacitic (approximately 63 to approximately 69% by weight $SiO_2$) comprises CaO of approximately 3 to approximately 8% by weight, MgO approximately 1 to approximately 6% by weight, $K_2O$ approximately 1% by weight, $Na_2O$ approximately 3% by weight and $Fe_2O_3$ approximately 4 to approximately 8% by weight; while rhyolitic (greater than 69% by weight $SiO_2$) comprises CaO of less than approximately 6% by weight, MgO less than 2% by weight, $K_2O$ approximately 4% by weight, $Na_2O$ approximately 3% by weight and $Fe_2O_3$ approximately 5% by weight. Therefore, the sum of carbonatable elements found in the basaltic hyaloclastite, volcanic ash or pumice is approximately 12 to approximately 42% by weight while the rhyolitic hyaloclastite, volcanic ash or pumice is less than 10% by weight. Therefore, a pozzolan from a basaltic source is far more desirable to sequester $CO_2$ in accordance with the present invention than a pozzolan from a rhyolitic source.

As used herein, the term "hyaloclastite" shall mean hyaloclastite from any and all sources; i.e., all hyaloclastites irrespective of the mineral source from which it is derived, unless otherwise designated.

As used herein, the term "natural pozzolan" shall mean hyaloclastite, volcanic ash, or pumice from any and all sources; i.e., all irrespective of the mineral source from which it is derived, unless otherwise designated, with an amorphous content of 10-100% and a crystalline content of 0-90% wherein the crystalline matrix is comprised of microcrystals.

Basaltic or mafic hyaloclastite, volcanic ash, or pumice generally has approximately 6 to approximately 18% by weight uncarbonated calcium found with the amorphous matrix or a combination of amorphous and micro crystalline matrix. As the amount of $SiO_2$ increases from the low 40% by weight for basaltic hyaloclastite, volcanic ash, scoria or pumice to the andesitic and dacitic silica range, the uncarbonated calcium, magnesium, iron decreased to where in the rhyolitic range there is virtually no uncarbonated calcium available.

Tables 1-2 below show chemical oxides analysis of hyaloclastite, volcanic ash, or pumice based pozzolans from various sources and shows CaO levels as well as the $Fe_2O_3$, MgO, correlated with the $SiO_2$ content. The values of the Ca, Mg, Fe, Na and K oxides shown in Table 1 below are examples of desirable oxide levels for carbonation in accordance with the present invention.

carbonates of various types. Additionally, when the pozzolan of this chemistry is dissolved in an alkaline solution, and mixed with carbon dioxide these elements are further available to react with carbon dioxide and form carbonates of various types. We note a significant amount a uncarbonated compounds in this chemistry where the ratio between the sum of $SiO_2/Al_2O_3$ and the sum of CaO/MgO/FeO is approximately 1.75-1.9 to 1. In general, the concrete industry is concerned with the total amount of alkalis in the cement paste due to the potential of high alkali content may react with silica and form the so-called alkali-silica reaction (ASR) which is damaging to concrete. In other words, it is preferred to have a pozzolan with the sum of $Na_2O$ and $K_2O$ as low as possible. In these three examples, it is noted that the total alkali is between 1.79-4.34%. We call this a relatively low amount of alkali. This limited amount of alkali is also available to react with carbon dioxide and create carbonates of various types. However, while a significantly higher amount of alkali would still react with carbon dioxide to create various types of carbonates, the risk is that at the same time the higher the amount of alkali the higher the risk of alkali-silica reaction. Therefore, it is desired to have a pozzolan with a relatively low sum of total alkalis.

The next three samples, AB, BKP and PVT, have similar basaltic chemical composition of total silica and alumina of 59.69-63.9% and a total amount of uncarbonated calcium, magnesium and iron oxides of 28.94-34.61%. We call these uncarbonated compounds due to the fact that they do not come from a carbonated mineral source. When ground to a small enough particle size and mixed with carbon dioxide

TABLE 1

Desirable chemical compositions of natural pozzolan suitable for carbon sequestration

| Elements | LS36-10 | TDR | SND | AB | BKP | PVT | RDF | THR | VCR | PTR |
|---|---|---|---|---|---|---|---|---|---|---|
| $SiO_2$ | 45.20 | 45.00 | 47.70 | 47.20 | 46.36 | 48.50 | 50.60 | 52.85 | 54.94 | 60.39 |
| $Al_2O_3$ | 14.09 | 17.60 | 15.33 | 12.49 | 11.96 | 15.40 | 15.00 | 14.53 | 14.87 | 13.05 |
| Total $SiO_2$, $Al_2O_3$ | 59.29 | 62.60 | 63.03 | 59.69 | 58.32 | 63.90 | 65.60 | 67.38 | 69.81 | 73.44 |
| CaO | 14.77 | 12.70 | 11.51 | 11.51 | 9.68 | 9.37 | 9.16 | 8.94 | 8.84 | 6.69 |
| MgO | 6.11 | 7.27 | 10.89 | 11.06 | 5.50 | 6.57 | 7.78 | 4.94 | 4.93 | 6.37 |
| FeO | 13.07 | 12.90 | 12.75 | 12.04 | 15.38 | 13.00 | 10.20 | 12.03 | 9.85 | 7.21 |
| Total CaO, MgO, FeO | 33.95 | 32.87 | 35.15 | 34.61 | 30.56 | 28.94 | 27.14 | 25.91 | 23.62 | 20.27 |
| $Na_2O$ | 3.22 | 1.83 | 1.58 | 1.72 | 2.60 | 3.40 | 3.34 | 2.69 | 2.63 | 2.23 |
| $K_2O$ | 1.12 | 0.21 | 0.21 | 0.40 | 0.70 | 1.14 | 1.48 | 0.76 | 0.86 | 2.27 |
| Total Alkali | 4.34 | 2.04 | 1.79 | 2.12 | 3.30 | 4.54 | 4.82 | 3.45 | 3.49 | 4.50 |

All examples above are minerals sampled, processed and analyzed by the inventor from various location around the world. The three-letter designation refers to the mineral source.

The first three samples, LS36-10, TDR and SND, show a basaltic chemistry with the $SiO_2$ of approximately 45-47% and $Al_2O_3$ of 14-17.6% this results in a total silica and alumina content of 59.29-63.03% available to react with calcium hydroxide from the cement hydration reaction (Ca—OH) to create calcium silicate hydrate C—S—H. This is called the typical pozzolanic reaction. The total amount of CaO, MgO and FeO found in these sample total approximately 32.87-35.15%. We call these uncarbonated compounds due to the fact that they do not come from a carbonated mineral source. When ground to a small enough particle size and mixed with carbon dioxide these compounds are available to react with carbon dioxide and form carbonates of various types. Additionally, when the pozzolan of this chemistry is dissolved in an alkaline solution, and mixed with carbon dioxide these elements are farther available to react with carbon dioxide and form carbonates of various types. We also note a significant amount an uncarbonated compounds in this chemistry where the ratio between the sum of $SiO_2/Al_2O_3$ and the sum of CaO/MgO/FeO is also approximately 1.72-2.2 to 1. The total sum of the alkalis is also relatively low between 2.12-4.54%. These examples show desirable levels of calcium, magnesium and iron oxides in accordance with the present inventions.

The next two samples, RDF and THR, have similar basaltic chemical composition of total silica and alumina slightly higher of 65.6-67.38% and a total amount of uncarbonated calcium, magnesium and iron oxides of 25.91-

27.14%. When ground to a small enough particle size and mixed with carbon dioxide these compounds are still available to react with carbon dioxide and form carbonates of various types. Additionally, when the pozzolan of this chemistry is dissolved in an alkaline solution, and mixed with carbon dioxide these elements are still farther available to react with carbon dioxide and form carbonates of various types. We also note a significant amount of uncarbonated compounds in this chemistry however the ratio between the sum of $SiO_2/Al_2O_3$ and the sum of $CaO/MgO/FeO$ is higher at approximately 2.4-2.6 to 1. The total sum of the alkalis is also relatively low between 2.12-4.54%. These examples show desirable levels of calcium, magnesium and iron oxides in accordance with the present inventions.

The next example, VCR, has an intermediate chemical composition of total silica and alumina slightly higher of 69.81% available to react with the calcium hydroxide from the cement hydration reaction (Ca—OH) to create calcium silicate hydrate C—S—H. The total amount of uncarbonated calcium, magnesium and iron oxides of 23.62%. When ground to a small enough particle size and mixed with carbon dioxide these compounds are still available to react with carbon dioxide and form carbonates of various types. Additionally, when the pozzolan of this chemistry is dissolved in an alkaline solution, and mixed with carbon dioxide these elements are still farther available to react with carbon dioxide and form carbonates of various types. We also note a significant amount of uncarbonated compounds in this chemistry however the ratio between the sum of $SiO_2/Al_2O_3$ and the sum of $CaO/MgO/FeO$ is higher at approximately 2.9 to 1. The total sum of the alkalis is also relatively low between 3.49%. This example shows a chemical composition with greater capacity for the pozzolanic reaction then the previous examples while at the same time a lower capacity for the carbonation. This examples still shows a sufficiently desirable levels of calcium, magnesium and iron oxides in accordance with the present inventions.

The last example, PTR, has an andesitic chemical composition of total silica and alumina slightly higher of 73.44% available to react with the calcium hydroxide from the cement hydration reaction (Ca—OH) to create calcium silicate hydrate C—S—H. The total amount of uncarbonated calcium, magnesium and iron oxides of 20.27%. When ground to a small enough particle size and mixed with carbon dioxide these compounds are still available to react with carbon dioxide and form carbonates of various types. Additionally, when the pozzolan of this chemistry is dissolved in an alkaline solution, and mixed with carbon dioxide these elements are still farther available to react with carbon dioxide and form carbonates of various types. We also note a significant amount of uncarbonated compounds in this chemistry however the ratio between the sum of $SiO_2/Al_2O_3$ and the sum of $CaO/MgO/FeO$ is higher at approximately 3.6 to 1. The total sum of the alkalis is also relatively low between 4.5%. This example shows a chemical composition with an even greater capacity for the pozzolanic reaction then the previous examples while at the same time a lower capacity for the carbonation. However, this examples still shows a sufficiently desirable level of calcium, magnesium and iron oxides in accordance with the present inventions.

The values of the Ca, Mg, Fe, Na and K oxides shown in Table 2 below are examples of less desirable oxide levels for carbon sequestration in accordance with the present invention.

TABLE 2

Pozzolans with less desirable carbonation properties

| Elements | CR | GP | MLO | GEO | WCL | CDH | MS | WHA | RHA | SF |
| --- | --- | --- | --- | --- | --- | --- | --- | --- | --- | --- |
| $SiO_2$ | 68.23 | 64.30 | 73.72 | 72.50 | 74.92 | 76.40 | 92.10 | 92.86 | 93.84 | 97.00 |
| $Al_2O_3$ | 14.68 | 15.23 | 12.66 | 11.40 | 13.05 | 12.30 | 2.13 | 1.88 | 1.93 | 0.20 |
| Total $SiO_2$ $Al_2O_3$ | 82.91 | 79.53 | 86.38 | 83.90 | 87.97 | 88.70 | 94.23 | 94.74 | 95.77 | 97.20 |
| CaO | 3.11 | 4.32 | 1.08 | 0.98 | 0.98 | 0.85 | 1.10 | 0.19 | 0.68 | 0.20 |
| MgO | 0.92 | 0.98 | 0.53 | 0.35 | 0.35 | 0.05 | 1.05 | 0.01 | 0.45 | 0.52 |
| FeO | 4.43 | 7.89 | 1.38 | 2.30 | 0.72 | 1.07 | 1.62 | 0.35 | 0.29 | 0.55 |
| Total CaO, MgO, FeO | 8.46 | 13.19 | 2.99 | 3.63 | 2.05 | 1.97 | 3.77 | 0.55 | 1.42 | 1.27 |
| $Na_2O$ | 3.18 | 4.19 | 3.41 | 3.75 | 3.75 | 3.71 | 0.10 | 0.25 | 0.10 | 0.22 |
| $K_2O$ | 2.74 | 1.69 | 3.15 | 4.22 | 4.22 | 5.37 | 1.32 | 0.78 | 1.38 | 0.51 |
| Total Akali | 5.92 | 5.88 | 6.56 | 7.97 | 7.97 | 9.08 | 1.42 | 1.03 | 1.48 | 0.73 |

The first two samples, CR and GP, show a dacitic chemistry with the $SiO_2$ of approximately 64.3-68.23% and $Al_2O_3$ of 14.68-15.3% this results in a total silica and alumina content of 79.53-82.91% available to react with the calcium hydroxide from the cement hydration reaction (Ca—OH) to create calcium silicate hydrate C—S—H. The total amount of CaO, MgO and FeO found in these sample total approximately 8.46-13.19%. When ground to a small enough particle size and mixed with carbon dioxide these compounds are available to react with carbon dioxide and form carbonates of various types. Additionally, when the pozzolan of this chemistry is dissolved in an alkaline solution, and mixed with carbon dioxide these elements are farther available to react with carbon dioxide and form carbonates of various types. However, we note a significantly less amount a uncarbonated compounds in this chemistry where the ratio between the sum of $SiO_2/Al_2O_3$ and the sum of $CaO/MgO/FeO$ is approximately 6.03-9.8 to 1. In general, the concrete industry is concerned with the total amount of alkalis in the cement paste due to the potential of high alkali content may react with silica and form the so-called Alkali-Silica reaction (ASR) which is damaging to concrete. In other words, it is preferred to have a pozzolan with the sum of $Na_2O$ and $K_2O$ a low as possible. In these two examples it is noted that the total alkali is between 5.88-5.92%. This is a larger amount of alkali than examples in Table 1. This amount of alkali is available to react with carbon dioxide and create carbonates of various types. However, while a significantly larger amount of alkali would still react with carbon dioxide to create various types of carbonates, the risk is that at the same time the higher the amount of alkali the higher the risk of alkali-silica reaction is increased in these two examples. Therefore, these two examples of pozzolans are less desirable to be used to sequester carbon dioxide.

The next four examples, MLO, GEO, WCL and CDH, show a rhyolitic chemistry with the $SiO_2$ of approximately 72.5-76.40% and $Al_2O_3$ of 11.40-13.05% this results in a total silica and alumina content of 83.90-88.70% available to react with the calcium hydroxide from the cement hydration reaction (Ca—OH) to create calcium silicate hydrate C—S—H. The total amount of CaO, MgO and FeO found in these sample are insignificant at a total of approximately 1.97-3.63%. Regardless of how finely ground the particle size is, when mixed with carbon dioxide these compounds are too insignificant to react with carbon dioxide and form carbonates of various types. We also note that the ratio between the sum of $SiO_2/Al_2O_3$ and the sum of CaO/MgO/FeO is approximately 23.11-45.3 to 1. This is not a desirable ratio sequester significant amount of carbon dioxide. As mentioned above the concrete industry is concerned with the total amount of alkalis in the cement paste due to the potential of high alkali content may react with silica and form the alkali-silica reaction (ASR) which is damaging to concrete. In these four examples it is noted that the total alkali is between 6.56-9.08%. This is a larger amount of alkali than the first two example in this table above, and of all examples in Table 1. While this amount of alkali is available to react with carbon dioxide and create carbonates of various types there is a significantly higher the risk of alkali-silica reaction is increased in these two examples. Therefore, these two examples of pozzolans are not desirable to be used to sequester carbon dioxide.

The next three examples, MS, WHA and RHA, are from the microsilica category. WHA is a wheat husk ash and RHA is a rice husk ash. These show a chemistry with the $SiO_2$ of approximately 92.10-93.84% and a very insignificant amount of $Al_2O_3$ of 1.88-2.13%. This results in a total silica and alumina content of 94.23-95.77% available to react with the calcium hydroxide from the cement hydration reaction (Ca—OH) to create calcium silicate hydrate C—S—H. The total amount of CaO, MgO and FeO found in these sample are also insignificant at a total of 3.77 for the MS and approximately 0.55-1.42%. Regardless of how finely ground the particle size is, when mixed with carbon dioxide these compounds are too insignificant to react with carbon dioxide and form carbonates of various types. We also note that the ratio between the sum of $SiO_2/Al_2O_3$ and the sum of CaO/MgO/FeO is approximately 24.99 for MS and 67.44-175.25 to 1 for the husk ashes. This is not a desirable ratio sequester significant amount of carbon dioxide. In these three examples it is noted that the total alkali is between 1.03-1.48%. This is a low amount of alkali which makes it a desirable pozzolan to react with the calcium hydroxide from the cement hydration reaction to create calcium silicate hydrate, however the high pozzolanic reactivity of these examples would outcompete the carbonation process and very little if any carbon dioxide would react with any calcium hydroxide in the cement paste, and no carbonation would be possible within the pozzolan itself. Therefore, these three examples of pozzolans are not desirable to be used to sequester carbon dioxide.

The last example, SF, is silica fume, a byproduct of the silicon manufacturing process. This shows a chemical composition of $SiO_2$ of approximately 97% and a very insignificant amount of $Al_2O_3$ of 0.20%. This results in a total silica and alumina content of 97.20% available to react with the calcium hydroxide from the cement hydration reaction (Ca—OH) to create calcium silicate hydrate C—S—H. The total amount of CaO, MgO and FeO found in this sample is very insignificant at a total of 1.27%. When mixed with carbon dioxide this product's chemical composition is too insignificant to react with carbon dioxide and form carbonates of various types. We also note that the ratio between the sum of $SiO_2/Al_2O_3$ and the sum of CaO/MgO/FeO is approximately 24.99 for MS and 76.54 to 1. This is not a desirable ratio to sequester any significant amount of carbon dioxide. In this example it is noted that the total alkali is between 0.73%. This is a very low amount of alkali which makes it a desirable pozzolan to react with the calcium hydroxide from the cement hydration reaction to create calcium silicate hydrate, however the high pozzolanic reactivity of the silica fume would outcompete the carbonation process and very little if any carbon dioxide would react with any calcium hydroxide in the cement paste, and no carbonation would be possible within the pozzolan itself. Therefore, silica fume is not a desirable pozzolan to be used to sequester carbon dioxide.

Table 3 below shows the chemical composition of various types of calcined clays.

TABLE 3

Calcined clay properties, showing pozzolans with properties not suitable for carbon sequestration according to the present invention

| Elements | SMC1 | SMC2 | IL | C | B3 | A1 | MLC | CC | K2 | K1 |
|---|---|---|---|---|---|---|---|---|---|---|
| $SiO_2$ | 41.84 | 58.03 | 52.62 | 34.05 | 37.07 | 45.99 | 52.58 | 54.70 | 59.90 | 62.62 |
| $Al_2O_3$ | 15.52 | 19.60 | 22.63 | 33.13 | 33.11 | 37.70 | 40.98 | 37.40 | 32.29 | 28.63 |
| Total $SiO_2$ $Al_2O_3$ | 57.36 | 77.63 | 75.25 | 67.18 | 70.18 | 83.69 | 93.56 | 92.10 | 92.19 | 91.25 |
| CaO | 3.84 | 0.02 | 0.12 | 1.10 | 0.01 | 0.01 | 0.09 | 0.84 | 0.04 | 0.06 |
| MgO | 2.99 | 2.36 | 2.32 | 0.39 | 0.34 | 0.16 | 0.43 | 0.42 | 0.17 | 0.15 |
| FeO | 13.80 | 4.08 | 6.64 | 6.58 | 10.20 | 0.90 | 3.12 | 1.72 | 1.28 | 1.07 |
| Total CaO, MgO, FeO | 20.63 | 6.46 | 9.08 | 8.07 | 10.55 | 1.07 | 3.64 | 2.98 | 1.49 | 1.28 |
| $Na_2O$ | 0.04 | 0.05 | 0.48 | 0.23 | 0.05 | 0.05 | 0.06 | 0.37 | 0.24 | 1.57 |
| $K_2O$ | 2.99 | 0.15 | 7.72 | 0.24 | 0.15 | 0.24 | 0.90 | 0.54 | 2.83 | 3.46 |
| Total Akali | 3.03 | 0.20 | 8.20 | 0.47 | 0.20 | 0.29 | 0.96 | 0.91 | 3.07 | 5.03 |

The first two examples, SMC1 and SMC2, show the chemical composition of smectite clay. The first example is a smectite clay with a $SiO_2$ composition of approximately 41.84% and an $Al_2O_3$ composition of 15.52%. This results in a total silica and alumina content of 57.36% available to react with the calcium hydroxide from the cement hydration reaction (Ca—OH) to create calcium silicate hydrate C—S—H. The total amount of CaO, MgO and FeO found in this example if of approximately 20.63%, however two thirds of this is from the iron oxide. The ratio between the total of calcium and magnesium oxide vs. the iron oxide and the is 1 to 2. This is not a desirable ratio for the carbonation. This is not a desirable ratio to sequester a significant amount of carbon dioxide. In this example it is noted that the total alkali is 3.03%. While this amount of alkali is available to react with carbon dioxide and create carbonates of various types there the overall chemical composition total iron oxide vs. everything else that could react with carbon dioxide is such that SMC1 is not a desirable pozzolan to sequester carbon dioxide. The second example of smectite clay, SMC2 shows a $SiO_2$ composition of approximately 58.03% and an $Al_2O_3$ composition of 19.6%. This results in a total silica and alumina content of 77.63% available to react with the calcium hydroxide from the cement hydration reaction (Ca—OH) to create calcium silicate hydrate C—S—H. The total amount of CaO, MgO and FeO found in this example if of approximately 6.46%, however as in the example above the iron oxide amount is high compared to the calcium and magnesium oxide. The ratio between the total of calcium and magnesium oxide vs. the iron oxide and the is 1 to 1.72. This is not a desirable ratio for the carbonation. This is not a desirable ratio sequester a significant amount of carbon dioxide. In this example it is noted that the total alkali is 0.20%. This amount of alkali is insufficient to react with carbon dioxide and create carbonates of various types and the overall chemical composition total iron oxide vs. everything else that could react with carbon dioxide is such that SMC2 is not a desirable pozzolan to sequester carbon dioxide. Therefore, these two examples of pozzolans are not desirable to be used to sequester carbon dioxide.

The first third examples, IL, is an ilmenite type clay with a $SiO_2$ composition of approximately 52.62% and an $Al_2O_3$ composition of 22.63%. This results in a total silica and alumina content of 75.25% available to react with the calcium hydroxide from the cement hydration reaction (Ca—OH) to create calcium silicate hydrate C—S—H. The total amount of CaO, MgO and FeO found in this example if of approximately 9.08%, however more than two thirds of this is from the iron oxide. The ratio between total of calcium and magnesium oxide vs. the iron oxide and the is 1 to 2.72. This is not a desirable ratio for the carbonation. This is not a desirable ratio to sequester a significant amount of carbon dioxide. In this example it is noted that the total alkali is 8.20%. While this amount of alkali is available to react with carbon dioxide and create carbonates of various types there the overall chemical composition total iron oxide vs. everything else that could react with carbon dioxide and the high alkali content that could react to create a alkali silica reaction is such that IL is not a desirable pozzolan to sequester carbon dioxide.

The next two examples, C and B3, are kaolinite type clays with a approximately equal amount of $SiO_2$ and $Al_2O_3$. These shows a $SiO_2$ composition of approximately 34.05-37.07% and an $Al_2O_3$ composition of approximately 33%. This results in a total silica and alumina content of 67.18-70.18% available to react with the calcium hydroxide from the cement hydration reaction (Ca—OH) to create calcium silicate hydrate C—S—H. This chemistry is that of an aluminosilicate pozzolan. The total amount of CaO, MgO and FeO found in this example if of approximately 8.07-10.55%, however as in these examples the iron oxide amount is very high compared to the sum of calcium and magnesium oxide. The ratio between total of calcium and magnesium oxide vs. the iron oxide is 1 to 4.4-29.14. This is not a desirable ratio for the carbonation. This is not a desirable ratio sequester significant amount of carbon dioxide. In this example it is noted that the total alkali is 0.20-0.47%. This amount of alkali is insufficient to react with carbon dioxide and create carbonates of various types and the overall chemical composition of total iron oxide vs. everything else that could react with carbon dioxide is such these two examples are not a desirable pozzolan to sequester carbon dioxide. Therefore, these two examples of pozzolans are not desirable to be used to sequester carbon dioxide.

The next example, Al, is also a kaolinite type clays with a higher amount of $SiO_2$ vs. $Al_2O_3$. These show a $SiO_2$ composition of approximately 46% and an $Al_2O_3$ composition of approximately 37.70%. This results in a total silica and alumina content of 83.67% available to react with the calcium hydroxide from the cement hydration reaction (Ca—OH) to create calcium silicate hydrate C—S—H. This is chemistry is that of an aluminosilicate pozzolan. The total amount of CaO, MgO and FeO found in this example is insignificant of approximately 1.07%. This is not a desirable amount for carbonation. In this example it is noted that the total alkali is 0.29%. This amount of alkali is insufficient to react with carbon dioxide and create carbonates of various types. Therefore, this example of pozzolans is not desirable to be used to sequester carbon dioxide.

The next four examples, MLC, CC, K2 and K1, are metakaolin pozzolan, a kaolinite type clay with a higher amount of $SiO_2$ vs. $Al_2O_3$. These shows a $SiO_2$ composition of approximately 52.58-62.62% and an $Al_2O_3$ composition of approximately 28.63-40.98%. This results in a total silica and alumina content of 91.25-93.56% available to react with the calcium hydroxide from the cement hydration reaction (Ca—OH) to create calcium silicate hydrate C—S—H. This is chemistry is that of an alumino-silicate pozzolan. The total amount of CaO, MgO and FeO found in this example is insignificant of approximately 1.28-3.64%, however in these examples the iron oxide amount is very high compared to the sum of calcium and magnesium oxide. This is not a desirable amount for the carbonation. In this example it is noted that the total alkali is 0.91-5.03%. This amount of alkali is insufficient to react with carbon dioxide and create carbonates of various types. Therefore, this example of pozzolans is not desirable to be used to sequester carbon dioxide.

Different natural pozzolans, including hyaloclastites, volcanic ashes or pumices, have different amounts of amorphous glass and crystalline content. The oxides shown in Tables 1-3 above is a method of determining the chemical composition and may not be a reflection of actual free oxides present within the matrix by themselves. The oxides may be part of complex formula of amorphous or microcrystalline structure.

Chemical composition as reported herein is measured by the XRF (X-ray fluorescence) method. This is a non-destructive analytical technique used to determine the elemental composition of materials. XRF analyzers determine the chemistry of a sample by measuring the fluorescent (or secondary) X-ray emitted from a sample when it is excited by a primary X-ray source. Each of the elements present in a sample produces a set of characteristic fluorescent X-rays ("a fingerprint") that is unique for that specific element, which is why XRF spectroscopy is an excellent technology for qualitative and quantitative analysis of material composition. The chemical analysis reported herein is the total oxides scan.

Sample preparation for XRF can be achieved using either of two distinct methods: a pressed powder and a fused glass disk. Pressed powder specimens are typically ground in a tungsten carbide ring and puck mill with a binding agent to reduce the particle size and provide a packed powder mount that will remain intact for transport and analysis. The advantages of this preparation method include the simplicity and better detection limits while disadvantages include what is known as the "mineralogical effect", which requires a similar matrix between a bracketed calibration and unknown specimens for the calibrations to be valid.

The state of the oxides makes them available to react with the carbon dioxide either on the surface of the micronized particle or once dissolved in an alkaline solution. In some cases, most if not all, elements are in an amorphous or a microcrystalline state or combination thereof, an uncarbonated state, which means when a pozzolan of specific particle size is dissolved in the highly alkaline solution, such as a cement paste, lime paste or compounds with reactive hydroxyl groups, such as, calcium, sodium or potassium hydroxide, the carbonatable elements are available to react with $CO_2$ to produce carbonates. In case of hyaloclastites, volcanic ashes, pumice, etc., containing some degree of crystalline elements, the carbonatable elements are contained in micro-crystals, such as clinopyroxene $Ca(Mg,Fe,Al,Ti)(Si,Al)_2O_6$, calcium plagioclase feldspars $(Na,Ca)Al(Si,Al)_3O_8$, olivine $(Fe,Mg)_2SiO_4$ are examples of crystalline materials that contain uncarbonated elements, such as calcium, magnesium, potassium, sodium and iron, that are available to combine with $CO_2$ to create carbonates. Examples of carbonates using these elements are one or more of the following: calcium carbonates, such as limestone, calcite, aragonite, vaterite, calcium-magnesium carbonates such as dolomite, magnesium carbonates, sodium carbonates, iron carbonates such as siderite and potassium carbonate, among others. Alternatively, any of the uncarbonated calcium, magnesium, iron, sodium, potassium may react in any particular fashion and form more complex crystal minerals such as olivine, pyroxenes, plagioclase feldspars, K-feldspars, mordenite, clinoamphibole, ilmenite or other similar crystal minerals. These carbonatable elements, and others, can be found in volcanic ashes, pumices and hyaloclastites of these chemistries can be in amorphous or microcrystalline form or a combination thereof.

The carbonation process of the elements above is accelerated at a higher temperature, but not as high as the decomposition temperature at which the carbonate releases $CO_2$ and returns to the oxide form. Therefore, concrete cured at an elevated but safe temperature will sequester a greater amount of $CO_2$ and also accelerate the hydration process and calcium silicate hydration formation. In particular precast concrete plants, CMU clock plants, and any other type of precast element plants that use curing chambers at elevated temperature would benefit from the use of the present pozzolan $CO_2$ sequestration process. Additional concrete elements made with these types of pozzolans containing carbonatable elements in accordance with the present invention can be cured in curing chambers, such as steam curing chambers, with $CO_2$ gas present within the chamber at concentrated levels above what is found in the atmosphere.

In particular a concrete or mortar object having hyaloclastite, volcanic ash or pumice pozzolan with the chemical properties described above, especially in Table 1, incorporated in the mortar or concrete mix using a hydraulic cement, when cured in a curing chamber with elevated carbon dioxide, will absorb and sequester increased amounts of carbon dioxide creating the carbonates or complex crystal minerals mentioned above when compared with objects made with concrete or mortar mixes of straight portland cement or a hydraulic cement and conventional pozzolans.

Furthermore, $CO_2$ gas can be added in various stages of the manufacturing process, such as being mixed with the concrete mix when batched or during the pozzolan manufacture process; i.e., during the pozzolan drying and/or grinding process. For cast in place applications, it is desirable to cure concrete with these carbonatable elements having carbon dioxide in its composition, in a concrete form that can retain the heat of hydration, such as the insulated forms and methods disclosed in U.S. Pat. Nos. 8,555,583; 8,756,890; 8,555,584, 8,532,815; 8,877,329; 9,458,637; 8,844,227; 9,074,379; 10,065,339; 10,220,542; 9,776,920; 9,862,118; 10,640,425; and 10,280,622 (all of which are incorporated herein by reference).

Table 4 below shows examples of hyaloclastites, volcanic ashes, or pumices that contain various amounts of amorphous and crystalline content. Examples 14 and 15 are rhyolitic glass such as perlite and the CaO content is below 1% compared with the basaltic in Examples 1-13 where CaO ranges between 9-16%.

TABLE 4

|   | "Amorphous" | Clinopyroxene Ca(Mg, Fe, Al, Ti) (Si, Al)2O6 | Plagioclase Feldspar (Na, Ca)Al(Si, Al) 3O8 | Olivine (Fe, Mg)2SiO4 | Calcite | Unidentified |
|---|---|---|---|---|---|---|
| 1 | >70 | — | 12 | 5 | 7 | <5 |
| 2 | >80 |  | 10 | <5 | — | <5 |
| 3 | >70 | <3? | 11 | <5 | — | <5 |
| 4 | >80 | — | 13 | <3 | — | <5 |
| 5 | >55 |  | 12 | 5 | 20 | <5 |
| 6 | >70 | — | 11 | 5 | <5 | <5 |
| 7 | >75 | — | 10 | 5 | — | <5 |
| 8 | >65 | — | 15 | 5 | <5 | <5 |
| 9 | >70 | <3? | 12 | 5 |  | <5 |
| 10 | >30 | 25 | 43 | 5 |  | <5 |
| 11 | >55 |  | 15 | 5 | 15 | <5 |
| 12 | >40 | 17 | 37 | 4 | 1 | <5 |
| 13 | >70 | — | 15 | 8 |  | <5 |
| 14 | >95 |  |  |  |  | <5 |
| 15 | >95 |  |  |  |  | <5 |

Referring now to FIG. 1, there is shown a flow diagram of a disclosed embodiment of a pozzolan processing plant 10 in accordance with the present invention. A natural pozzolan, such as hyaloclastite, is mined from the ground at a mine site. Unprocessed hyaloclastite may have a particle size of about 1/32 to 1/2 an inch or in the range a very fine sand to gravel. The hyaloclastite is transported from the mine site to the pozzolan processing plant 10 where it is deposited in a supply pile 12. The hyaloclastite in the supply pile 12 may a moisture content of approximately 2 to 20% by weight. However, in order to reduce the particle size of the unprocessed hyaloclastite to the micron range, it must have a moisture content of approximately 2% by weight or lower. Therefore, it is necessary to dry the unprocessed hyaloclastite, volcanic ash or pumice. Accordingly, unprocessed hyaloclastite from the supply pile 12 is transported from the pile to a dryer 14 by a conveyor belt 16. The dryer 14 is typically a rotating drum or fluid bed (not shown) with a gas flame that projects into the drum or fluid bed or by an electric heating element. Helical flights or conveyer belts within the drum or fluid bed dryer move the hyaloclastite, volcanic ash or pumice, from the inlet of the drum or fluid bed to the outlet. The temperature inside the dryer is sufficiently high to allow for the desired reduction in moisture based on the moisture content of the materials fed into the dyer. From the dryer 14, the dried hyaloclastite, volcanic ash or pumice is transported to a micronizing mill 18 by either a conveyor belt or a screw conveyor 20. The mill 20 reduces the particle size of the hyaloclastite, volcanic ash or pumice, from the size it was mined to a desired particle size in the micron range. From the mill 18, the reduced size hyaloclastite, volcanic ash or pumice, is lifted by the air flow into a particle size classifier 22 connected by a duct or pipe 24. The classifier separates particles that meet a desired size criteria from those that do not meet the criteria. Those particles that meet the size criteria are passed from the classifier 22 to a storage silo 26 by air flow or a screw conveyor 28. Those particles that are bigger than the size criteria are transported from the classifier 22 back to the input of the ball mill 18 by a retuning duct or pipe 30. The storage silo 26 is used to contain the hyaloclastite, volcanic ash or pumice pozzolan of the desires particle size range until it can be transported, such as by rail or truck, to a customer.

In a disclosed embodiment, the present invention comprises a natural pozzolan from a hyaloclastite, volcanic ash or pumice with a chemical composition preferably comprising approximately 40 to approximately 65 percent by weight $SiO_2$, approximately 10 to approximately 18 percent by weight $Al_2O_3$, 4 to approximately 20 percent by weight CaO, and optionally one or more of approximately 3 to approximately 15% MgO and approximately 4 to approximately 18 percent by weight $Fe_2O_3$, ground into powder form. The particle size of the pozzolan powder is sufficiently small such that the hyaloclastite, volcanic ash or pumice powder has pozzolanic properties. In accordance with the present invention, in one embodiment, $CO_2$ is fed or injected into a grinding mill; e.g., the micronizing mill 18, as the pozzolan particles; e.g., hyaloclastite, volcanic ash or pumice particles, are ground or reduced in size so that the ground particles are exposed to the $CO_2$. During this grinding or particle size reduction process, $CO_2$ will bind to the surface of the fine pozzolan particles. The pozzolan powder preferably has a volume-based mean particle size of less than or equal to approximately 40 µm, of approximately 20 µm, more preferably less than or equal to 16 µm, most preferably less than or equal to 12 µm, especially less than or equal to 10 µm, more especially less than or equal to 8 µm and most especially less than or equal to 4 µm. The smaller the particle size for the pozzolan powder, the greater the surface area of the pozzolan for the $CO_2$ to react with and/or carbonate one or more of the CaO, MgO, NaO, KO, $Fe_2O_3$ or other uncarbonated elements in the pozzolan as well as be activated by an OH group to initiate and sustain the pozzolanic reaction. However, there are economic limits for grinding rock to small particle sizes. Those limits are well known by those skilled in the art. The pozzolan powder preferably has a Blaine value of approximately 1,500 to approximately 10,000, more preferably approximately 3,500 to approximately 10,000, most preferably approximately 4,500 to approximately 10,000, especially approximately 6,000 to approximately 10,000. The pozzolan powder preferably has a Blaine value of greater than or equal to approximately 10,000. The foregoing ranges include all of the intermediate values. As the pozzolan is ground to the desired particle size, such as in the ball mill 18, carbon dioxide in a gas, liquid or solid form is injected, mixed or blended with the pozzolan particles within the grinding mill or at any other suitable point in the grinding mill circuit 10, such as in the dryer 14, the screw conveyor 28 and/or the storage silo 26. Alternatively, in another embodiment, the $CO_2$ in either a gas, liquid or solid form can be injected, mixed or blended with the ground pozzolan particles after the pozzolan has been ground to the desired particle size. As an example, $CO_2$ can be mixed with the final pozzolan product as it leaves the classifier 22 and before it is stored in the silo 26. The finished pozzolan powder that is collected from the particle size classifier 22 can be transported to the storage silo 26 using an enclosed or sealed screw conveyor 28 of a desirable diameter and length. A series of pipes and nozzles can be attached to the screw conveyer housing along the length thereof, preferably in multiple rows around the radial section of it, so that $CO_2$ can be injected into the conveyor housing as the pozzolan powder travels thorough the conveyer. Thus, the ground pozzolan powder is exposed to $CO_2$ as it travels from the particle classifier 22 to the storage silo 26. It is also desirable that the screw conveyer assembly is sufficiently sealed so that the $CO_2$ is retained therein to be mixed or blended with the pozzolan powder. It is also desirable that the $CO_2$ is delivered at a pressure sufficient to thoroughly penetrate thorough the moving body of powder so that between the pressure of the gas being fed into the screw conveyer nozzles and the movement of the screw conveyer that the $CO_2$ is dispersed throughout the powder and makes contact with the surface of the particles of the pozzolan powder.

A screw or auger profile can contribute to the quality and the efficiency of the mixing or blending of $CO_2$ with the pozzolan powder in the screw conveyor 28. A screw auger can have different flight and pitch types as follows: a standard pitch, single flight screws have the outside diameter equal to the pitch and are the most common screw type used for horizontal screw conveyors and inclines up to 10-degrees; variable pitch, single flight screws have increasing pitch with every flight and are used in screw feeders to provide uniform withdrawal of free-flowing bulk materials from hoppers, bins or silos; short pitch, single flight screws have the pitch reduced to 2/3 of the diameter and are most commonly used in inclined and vertical screw conveyor applications. Short pitch is also used in some variable pitch screw feeder applications. Standard pitch, double flight screws have the outside diameter equal to the pitch, very similar to standard pitch, single flight. A second set of flights is added 180-degrees apart from the first set of flights to provide a more even discharge of bulk materials. Standard pitch, double flight screws have the outside diameter equal to the pitch, very similar to standard pitch, single flight. A second set of flights is added 180-degrees apart from the first set of flights to provide a more even discharge of bulk materials. Half pitch, single flight screws have the pitch reduced to ½ of the diameter and are commonly used in inclined and vertical screw conveyor applications. ½ pitch is also used in some variable pitch screw feeder applications. Standard pitch, single tapered flight screws have a tapered outside diameter increasing from ½ to full diameter and are used in screw feeders to provide uniform withdrawal of free-flowing bulk materials from hoppers, bins or silos. Standard pitch, single ribbon flight screws have a space within the flight and around the center pipe to minimize the collection and buildup of viscous and sticky bulk materials. For additional mixing efficiency, it is desirable to use a conveyer with paddles or profile that can promote mixing or agitation in accordance with the present invention. Examples of these are: standard pitch, single flight with paddle screws have adjustable paddles located between the screw flights. Up to four paddles per pitch can be added for gentle and thorough mixing of the pozzolan powder and the $CO_2$. Another example is a standard pitch, single cut flight screw notched at regular intervals on the outer edge to promote mixing and agitation of bulk material. Standard pitch, paddle screws with adjustable paddles are located in a helix around the diameter of the center pipe. Up to four paddles per pitch can be used for aggressive mixing and controlled flow of the pozzolan powder and $CO_2$ mixing. Another type is a standard pitch, single cut and folded flight screws that are notched at regular intervals on the outer edge and have lifting paddles to promote aggressive mixing and agitation of the pozzolan powder and the $CO_2$.

As the pozzolan powder travels through the length of screw conveyor 28, the mixing of the powder and $CO_2$ should be optimized between the travel time, which is directly related to the rotation speed of the screw auger, to affect a sufficient amount of mixing of the $CO_2$ and the pozzolan particles so that the $CO_2$ contacts and reacts with the surface of the pozzolan particles. Since the particles of the pozzolan powder have a suitable small particle size and large surface area with a certain degree of porosity in accordance with the present invention, when the $CO_2$ contacts the pozzolan particles surface the $CO_2$ will be adsorbed on the surface or absorbed in the particles and will start a carbonation process where the $CO_2$ will react with one or more of the CaO, MgO, FeO, KO, NaO, to convert the oxide form to a carbonate form or some other type of crystal mineral that embodies carbon in its structure. The pozzolan powder within the grinding mill, such as the micronizing mill 22, and/or coming from the grinding mill will be at an elevated temperature due to the mechanical energy spent to break down the larger mineral particles into a fine powder. As such the elevated temperature of the pozzolan powder while contacting the $CO_2$ will initiate and/or facilitate the carbonation reaction. It is also desirable that the screw conveyer 28 is heated with an electric heating element or infrared energy while the $CO_2$ is mixed or injected into screw conveyer. It is also desirable that the mixing and blending of $CO_2$ is aided by a light or electrostatic process that will enhance the pozzolan powder affinity to attract and bind, absorb or adsorb $CO_2$ onto its surface and accelerate the carbonation reaction on the particle surface.

In another embodiment the pozzolan powder can be mixed with carbon dioxide and a carbon nanomaterial. Graphite nanoplatelets (GP), carbon nanofibers (CNF), activated carbons (ACs), carbon nanotubes (CNTs) and similar carbon nanomaterials have a high surface area and porosity of various nanostructures with high gas adsorption properties. Due to high porosity these materials have a high adsorption rate of gases, therefore $CO_2$ can be adsorbed into these materials structure. Graphene, a new class of carbon nanomaterials, is found to be economical and has novel properties similar to CNTs. Anyone of these types of carbon nanomaterials can be mixed with carbon dioxide and the pozzolan powder in conveyer 28. Alternatively, carbon nanomaterials impregnated with carbon dioxide prior to mixing with the pozzolan powder can also be mixed or blended with the pozzolan powder having the chemical and physical properties described above. Therefore, these materials allow a high amount of carbon dioxide to be stored on the surface of the pozzolan and delivered into the concrete mix to farther react with the uncarbonated Ca, Mg, Fe, Na, K and the like.

The mixture of the pozzolan powder and $CO_2$ and optionally the carbon nanomaterials, can then be stored in a hopper, bin or silo 26 until transported to a concrete manufacturing facility. During storage of the pozzolan powder in the silo 26, the pozzolan powder continues to be exposed to $CO_2$. Therefore, in accordance with the present invention additional $CO_2$ is delivered to the silo 26. The $CO_2$ delivered to the silo 26 can be at atmospheric pressure or preferably at an elevated pressure, such as up to and including 3 atmospheres (this range includes all of the intermediate values).

It is also desirable that the dryer 14 be heated with an electric heating element and that $CO_2$ be injected into the dryer. Since the pozzolan in the dryer 14 has a moisture content, as the pozzolan is dried steam will be produced. The combination of the steam, the dryer heat and the $CO_2$ will result in a carbonation reaction between the $CO_2$ and the pozzolan within the dryer 14.

It is also desirable that the pozzolan grinding is aided by a grinding aid that will enhance the pozzolan powder affinity to attract and bind, absorb or adsorb $CO_2$ onto its surface either through a physical, a chemical or electrostatic process. Such grinding aids are known in the industry and different types work differently to accomplish similar properties. There are different types of grinding aids such as aliphatic amines (triethylenete-tramine (TETA)) and tetraethylene-pentamine (TEPA)) and alcoholamines (diethanolamine (DEA), triethanolamine (TEA) and triisopropanolamine (TIPA)). Glycol compounds are represented as ethylene glycol (EG) and diethylene glycol (DEG). In addition, there are more complex compounds such as aminoethyletha-nolamine (AEEA) and diethylenetri-amine hydroxyethyl (HEDETA). Phenol and phenol-derivatives are also used as grinding aids or any combinations thereof of one or more of the above. By using grinding aids, the organic additives are adsorbed on the surface of the pozzolan particles. This reduces the energy needed to break down the particles and reduces the surface charge. The latter is thus preventing the cohesion of pozzolan particles. The organic additives also change the electrostatic forces between the particles by reducing the attraction forces (Van der Waal) and increasing the repulsion forces. The additives are thus behaving as surfactants. Many grinding additives are reported to give beneficial effects during hydration.

A protein can also be used as a grinding aid or an admixture to the grinding process to coat the pozzolan particle surface so that it binds, absorbs, adsorbs or otherwise stores $CO_2$ onto the particle surface. Peptides, barnacle cement protein, cement proteins can also be used. Six barnacle-specific cement proteins (CPs) have been identified, four of which are thought to be interface proteins, CP19k, −20 k, −43 k, and −68 k, and two bulk proteins, CP52k and CP100k. Barnacle-specific CPs are those proteins present in the cement that share no homology with any other marine adhesive proteins or any other proteins. Soy protein can be used in a ratio of 0.05-1.5% by weight to the pozzolan during the grinding process. Carbon nanomaterials can also be added into the grinding mill.

While it is desirable to mix the $CO_2$ with the pozzolan powder at the pozzolan manufacturing plant, the pozzolan powder in accordance with the present invention can be delivered to a concrete readymix producer or precast plant and the like and the $CO_2$ added to the pozzolan powder using a similar process described above similar to the screw conveyer 28 is injecting or mixing $CO_2$ into the pozzolan powder. Alternatively, any other type of mixer or blender may mix or inject $CO_2$ into the pozzolan powder similar to the process using the screw conveyer 28 above. Alternatively, the pozzolan powder in accordance with the present invention can be delivered to a concrete readymix producer and the $CO_2$ added to the pozzolan powder and hydraulic cement during the blending and/or concrete mixing process using any process known in the prior art. Similarly, the pozzolan powder can be delivered to a cement or lime plant where the $CO_2$ can be added to the pozzolan powder during the blending process using any process known in the prior art. Another method of adding $CO_2$ to the pozzolan powder is to mix the $CO_2$ with the pozzolan powder and a hydraulic cement or lime, hydrated lime or quick lime in powder form prior to delivery to a concrete producer and prior to mixing with water. Yet another method of adding $CO_2$ to the pozzolan powder is to blend or otherwise mix the pozzolan powder, the $CO_2$ and aggregate in dry form prior to mixing with water. Still another method of adding $CO_2$ to the pozzolan powder is to blend or otherwise mix the pozzolan powder, the $CO_2$, aggregate and water.

In another embodiment, the pozzolan with the chemical and physical properties described above can be delivered to the ready mix or precast plant and stored in a silo in powder form. Prior to the mortar or concrete batch mixing of pozzolan, cement and aggregate, the pozzolan powder in accordance with this invention, is mixed with carbonated water or carbonic acid and made into a slurry or a liquid admixture and stored into an enclosed tank. Alternatively, the pozzolan powder is mixed with water and carbon dioxide into a liquid mixture with a high concentration of carbon dioxide within the mixture. This liquid or slurry mixture is then kept for a length of time sufficient to allow the pozzolan to react with or absorb the carbon dioxide. After the satisfactory length of time the after the pozzolan reaction with the carbon dioxide or the carbonic acid from the slurry would lower the amount of carbon dioxide or carbonic acid to a level where the slurry can then be added into a concrete batch plant mixer to be mixed with cement, aggregate and water. In such case the quantity of water added to the mixing of cement, aggregate and carbonated pozzolan slurry would have to be adjusted to take into consideration the amount of water present in the carbonated pozzolan slurry or admixture. Alternatively, and optionally, various types of chemical admixtures can be added to the pozzolan when mixing with carbonic acids or carbonated water. Such admixtures can be water reducers and any other concrete property enhancing admixtures as well as pozzolan carbonation enhancing properties. In addition, proteins that can enhance the pozzolan absorption, adsorption or carbonation may be mixed in with the pozzolan and the carbonated water, carbonic acid or carbon dioxide. A protein that coats the pozzolan particle so that it binds, absorbs, adsorbs or otherwise stores $CO_2$ onto the particle surface. Peptides, barnacle cement protein, cement proteins can also be used. Six barnacle-specific cement proteins (CPs) have been identified, four of which are thought to be interface proteins, CP19k, −20 k, −43 k, and −68 k, and two bulk proteins, CP52k and CP100k. Barnacle-specific CPs are those proteins present in the cement that share no homology with any other marine adhesive proteins or any other proteins. Soy protein may be used in a ratio of 0.05-1.5% by weight to the pozzolan during the mixing of pozzolan and the carbon dioxide, carbonated water or carbonic acid.

Micro-organisms that have the capacity to produce carbonates through its metabolic activity to improve the carbonation process can also be used. In nature, a lot of bacteria are capable of precipitating calcite ($CaCO_3$) and potentially other carbonates. According to the way calcium carbonate is produced, the general used bacteria could be primarily categorized into two sorts, i.e., urease bacteria and non-urease bacteria. Various urease bacteria exist in nature, among which *Bacillus pasteurii, Bacillus aerius, Bacillus sphaericus, Sporosarcina aquimarina, Bacillus megaterium*, etc. are frequently proposed for the self-healing concrete. *Bacillus pasteurii*, a Gram-positive bacterium isolated from soil, can grow normally at temperatures ranging from 15 to 37° C. The urease activities of *Bacillus pasteurii* is outstanding, which could rapidly decompose urea in the environment into ammonium and carbonate. *Bacillus megaterium* belongs to Gram-positive bacterium. Its survival and growth temperature interval extends largely between 3 and 45° C. *B. sphaericus*, Gram-positive aerobic bacterium, forms ellipsoidal spores and is able to produce urease to hydrolyzed urea. Bacterial urease can hydrolyze urea, which will cause $CaCO_3$ precipitation and provide improved properties in concrete. In metabolism, urease-catalyzing urea hydrolysis is secreted by urease organisms. The non-urease bacteria, *Bacillus pseudofirmus, Bacillus cohnii, Bacillus halodurans, Bacillus* mucilaginous L3, *Enterococcus faccalis, Geobacillus stearothermophilus, Bacillus subtilis*, etc., are widely studied as non-urease bacteria inducing calcium carbonate precipitation. *Bacillus subtilis* is a Gram-positive bacterium that forms oval or cylindrical spores. Numerous *Bacillus subtilis* are used in agriculture and in some medicines, therefore it is not detrimental to human health. The *Bacillus pseudofirmus* hydrolyze urea into $NH_3$ and $CO_2$ by using urease produced by themselves. For non-urease bacteria, they will transform organic acids to form calcium carbonate precipitates through their own vital activities under oxygen-containing conditions. Calcium lactate or calcium acetate are often added to nutrients that non-urease bacteria can eventually convert to calcium carbonate. Most microorganisms are intolerant to alkaline environments. The *Bacillus pseudoadamentosa* has an exceptional ability to adapt to the alkaline conditions where the surviving pH value can be up to 11.0. At 10 pH condition, the growth of *Bacillus pseudofirmus* is fast, indicating the most alkali-resistant behavior. The microporous structure of the pozzolan powder can provide adequate room and sustain excellent connectivity for the growth and metabolism of microorganisms. Meanwhile, the comparatively thick surface can reduce the penetration of high alkali substances, which can significantly increase the tolerance of concrete bacteria. *Bacillus pasteurella* was found to survive in concrete (pH=12) with the protection of zeolite and to produce calcium carbonate crystals.

Graphite nanoplatelets (GP), carbon nanofibers (CNF), activated carbons (ACs), carbon nanotubes (CNTs) and similar carbon nanomaterials have shown good gas adsorption properties. Due to high porosity, these materials have a high adsorption rate of gases, therefore $CO_2$ can be adsorbed into these materials structure. Graphene, as new class of carbon nanomaterials, is found to be economical and has novel properties similar to CNTs. Carbon nanomaterials impregnated with carbon dioxide would then be mixed or blended with the pozzolan having the chemical and physical properties described above. Therefore, these materials allow a relatively large amount of carbon dioxide to be stored on the surface of the pozzolan or in the pozzolan slurry or admixture and delivered into the concrete mix to further react with the uncarbonated Ca, Mg, Fe, Na, K and the like.

In another disclosed embodiment, the present invention comprises hyaloclastite, volcanic ash or pumice in powder form. The particle size of the hyaloclastite, volcanic ash or pumice powder is sufficiently small such that the hyaloclastite, volcanic ash or pumice powder has pozzolanic properties. The hyaloclastite, volcanic ash or pumice powder preferably has a volume-based mean particle size of less than or equal to approximately 40 μm, more preferably less than or equal to 20 μm, most preferably less than or equal to 15 μm, especially less than or equal to 10 μm, more especially less than or equal to 5 μm. The smaller the particle size for the hyaloclastite, volcanic ash or pumice powder the better. However, there are economic limits for grinding rock to small particle sizes. Those limits are well known by those skilled in the art. The hyaloclastite, volcanic ash or pumice powder preferably has a Blaine value of approximately 1,500 to approximately 10,000, more preferably approximately 3,500 to approximately 10,000, most preferably approximately 4,500 to approximately 10,000, especially approximately 6,000 to approximately 10,000. The hyaloclastite, volcanic ash or pumice powder preferably has a Blaine value of greater than or equal to approximately 10,000. The foregoing ranges include all of the intermediate values.

To achieve the desired particles size, the hyaloclastite, volcanic ash or pumice mineral can be ground using conventional mineral grinding equipment including, but not limited to, a ball mill, a roll mill or a plate mill. A particle size classifier can be used in conjunction with the mill to achieve the desired particle size. Equipment for grinding and classifying hyaloclastite to the desired particle size is commercially available from, for example, F. L. Smidth, Bethlehem, PA; Metso, Helsinki, Finland and others. The ground hyaloclastite, volcanic ash or pumice powder is then preferably classified by screening the powder with a 325-mesh screen or sieve. Preferably approximately 90% by volume of the hyaloclastite, volcanic ash or pumice mineral powder passes through a 325-mesh screen, especially approximately 95% by volume of the hyaloclastite, volcanic ash or pumice mineral powder passes through a 325-mesh screen and more especially approximately 100% by volume of the hyaloclastite volcanic ash or pumice powder passes through a 325-mesh screen. Preferably approximately 90% to approximately 100% by volume of the hyaloclastite, volcanic ash or pumice powder passes through a 325-mesh screen, most preferably approximately 95% to approximately 100% by volume of the hyaloclastite, volcanic ash or pumice mineral powder passes through a 325-mesh screen, especially approximately 100% by volume of the hyaloclastite, volcanic ash or pumice mineral powder passes through a 325-mesh screen.

As stated above, $CO_2$ is added during the grinding process or it can be added in a post grinding process in a separate chamber, such as the storage silo 26, where pozzolan of the desired particle size is blended or mixed with $CO_2$ at a desirable temperature and pressure. In particular $CO_2$ in gaseous, liquid or solid form can be added to the grinding process similarly to a grinding aid.

As stated above, grinding aids of various types can be added to the grinding process to improve the energy efficiency and pozzolanic properties as well as binding $CO_2$ to the pozzolan and/or reacting the $CO_2$ with uncarbonated compounds in the pozzolan.

Hyaloclastite, volcanic ash or pumice, can be ground in the presence of clinker and $CO_2$ to create a blended cement. Alternatively, limestone can be added to the mix during the grinding process or after. Slag cement can also be added in various amounts depending on the desired application and properties. Fly ash or any other type of pozzolan can be added to hyaloclastite, volcanic ash or pumice to create a blended hyaloclastite, volcanic ash or pumice-based pozzolan or cement in any suitable percentage.

Additionally, biological organisms or compounds can be added to improve the carbonation process of the uncarbonated materials. These biological organisms may be bacteria, enzymes or a wide range of proteins capable of favoring the nucleation of carbonate crystals, such as calcite, aragonite, vaterite, dolomite, siderite and other crystals in specific orientations. Peptides, barnacle cement protein, cement proteins can be used. Six barnacle-specific cement proteins (CPs) have been identified, four of which are thought to be interface proteins, CP19k, -20 k, -43 k, and -68 k, and two bulk proteins, CP52k and CP100k. Barnacle-specific CPs are those proteins present in the cement that share no homology with any other marine adhesive proteins or any other proteins.

$CO_2$ can be added also to mixing water used in the concrete mix so that the mixing water contains carbonic acid or is carbonated water. Alternatively, carbon nanomaterials impregnated with carbon dioxide can be added to the concrete or mortar mix along with the pozzolan having the chemical and physical properties described above.

In one disclosed embodiment of the present invention, the hyaloclastite, volcanic ash or pumice preferably has a chemical composition of approximately 40% to approximately 65% by weight $SiO_2$, approximately 10% to approximately 18% by weight $Al_2O_3$, 4% to approximately 20% by weight CaO, approximately 3% to approximately 15% by weight MgO, approximately 4% to approximately 18% by weight $Fe_2O_3$, approximately In addition to the foregoing, other compounds can be present in small amounts, such as $K_2O$, $TiO_2$, $P_2O_5$, MnO, various metals, rare earth trace elements and other unidentified elements. When combined, these other compounds represent less than 10% by weight of the total chemical composition of the hyaloclastite, volcanic ash or pumice mineral.

In another disclosed embodiment, the hyaloclastite, volcanic ash or pumice in accordance with the present invention preferably has a density or specific gravity of approximately 2.4 to approximately 3.1.

Hyaloclastite, volcanic ash or pumice in accordance with the present invention can be in crystalline or amorphous (glassy) form and is usually found as a combination of both in varying proportions. Preferably, the hyaloclastite, volcanic ash or pumice in accordance with the present invention comprises approximately 0% to 100% by weight amorphous form, more preferably approximately 10% to approximately 80% by weight amorphous form, most preferably approximately 20% to approximately 60% by weight amorphous form, especially approximately 30% to approximately 50% by weight amorphous form. The crystalline portion of hyaloclastite, sideromelane or tachylite preferably comprises approximately 3% to approximately 20% by weight olivine, approximately 5% to approximately 40% by weight clinopyroxene, approximately 5% to approximately 60% by weight plagioclase, and approximately 0% to approximately 40% (or less than 40%) by weight other minerals including, but not limited to, magnetite, UlvoSpinel, quartz, feldspar, pyrite, illite, hematite, chlorite, calcite, hornblende, biotite, K-feldspars, mordenite, clinoamphibole, ilmenite hypersthene (an orthopyroxene), feldspathoids sulfides, metals, rare earth minerals, other unidentified minerals and combinations thereof. The foregoing ranges include all of the intermediate values.

Hyaloclastite, volcanic ash or pumice or combinations or mixtures thereof in accordance with the present invention can be used as a supplementary cementitious material in concrete or mortar mixes and combined with $CO_2$ by means of injection, as described in the above or other methods used in the prior art. The $CO_2$ can be in a gas, liquid, solid or any other form when combined with the uncarbonated pozzolan, hyaloclastite, volcanic ash or pumice or with the cement or concrete containing uncarbonated pozzolan or hyaloclastite volcanic ash or pumice. Hyaloclastite, volcanic ash or pumice in accordance with the present invention is not by itself a hydraulic cement, but the silica and alumina component is activated by CaOH (hydrate lime) produced by the hydration of hydraulic cements, such as portland cement, or by other minerals or compounds having reactive hydroxyl groups, such as calcium hydroxide CaOH, sodium hydroxide NaOH, potassium hydroxide KOH, lithium hydroxide LiOH, or CaO (quick lime). In addition, hyaloclastite, volcanic ash or pumice in accordance with the present invention when mixed with cement can improve the cement nucleation process thereby improving the cement hydration process and further when combined with $CO_2$ by means of injection, as described above, or others methods known in the prior art improve the cement or concrete properties. Hyaloclastite, volcanic ash or pumice in fine particles generally yields shorter set times and accelerates hydration in blended cements and when combined with $CO_2$ by means of injection, as described above or other methods known in the prior art improve the cement or concrete properties. Fine particle size hyaloclastite, volcanic ash or pumice increases the rate of hydration heat development and early-age compressive strength in portland cement. The pozzolan with the chemical and physical properties according with the present inventions also improves the rate and amount of calcium, magnesium, and other types of carbonation formation when combined with $CO_2$ by means of injection, as described above or others methods known in the prior art and improve concrete properties. This acceleration may be attributable to the hyaloclastite volcanic ash or pumice (nucleation sites), its crystalline make-up and/or chemical composition. Hyaloclastite, volcanic ash or pumice in accordance with the present invention can be used in combination with any hydraulic cement, such as portland cement. Other hydraulic cements include, but are not limited to, blast granulated slag cement, calcium aluminate cement, belite cement (dicalcium silicate), phosphate cements and others. A hydraulic cement such as portland cement may contain various amounts of ground limestone depending on the type of cement, code approval, local jurisdiction and application, anywhere from less than 5% and up to 40%. Also, hyaloclastite, volcanic ash or pumice in accordance with the present invention by itself can be blended with lime, hydrated lime or quick lime to form a cementitious material. In one disclosed embodiment, blended cementitious material for cement or mortar preferably comprises approximately 10% to approximately 90% by weight hydraulic cement and approximately 10% to approximately 90% by weight hyaloclastite, volcanic ash or pumice or mixtures thereof in accordance with the present invention, more preferably approximately 20% to approximately 80% by weight hydraulic cement and approximately 20% to approximately 80% by weight hyaloclastite, volcanic ash or pumice or mixtures thereof in accordance with the present invention, most preferably approximately 30% to approximately 70% by weight hydraulic cement and approximately 30% to approximately 70% by weight hyaloclastite, volcanic ash or pumice or mixtures thereof in accordance with the present invention, especially approximately 40% to approximately 60% by weight hydraulic cement and approximately 40% to approximately 60% by weight hyaloclastite, volcanic ash or pumice or mixtures thereof in accordance with the present invention, more especially approximately 50% by weight hydraulic cement and approximately 50% by weight hyaloclastite, volcanic ash or pumice or mixtures thereof in accordance with the present invention, and most especially approximately 70% by weight hydraulic cement and approximately 30% by weight hyaloclastite, volcanic ash or pumice or mixtures thereof in accordance with the present invention. In another disclosed embodiment of the present invention, cementitious material for concrete or mortar preferably comprises approximately 50% to approximately 90% by weight hydraulic cement and approximately 10% to approximately 50% by weight hyaloclastite, volcanic ash or pumice or mixtures thereof in accordance with the present invention. The foregoing ranges include all of the intermediate values.

The present invention can be used with conventional concrete mixes. Specifically, a concrete mix in accordance with the present invention comprises cementitious material, aggregate and water sufficient to hydrate the cementitious material. The cementitious material comprises a hydraulic cement and hyaloclastite, volcanic ash or pumice or mixtures thereof in accordance with the present invention. The amount of cementitious material used relative to the total weight of the concrete varies depending on the application and/or the strength of the concrete desired. Generally speaking, however, the cementitious material comprises approximately 6% to approximately 30% by weight of the total weight of the concrete, exclusive of the water, or 200 lbs/yd³ (91 kg/m³) of cement to 1,200 lbs/yd³ (710 kg/m³) of cement. In ultra-high performance concrete, the cementitious material may exceed 25%-30% by weight of the total weight of the concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. For high performance concrete and ultra-high performance concrete, lower water-to-cement ratios are used, such as approximately 0.20 to approximately 0.25. Aggregate usually comprises 70% to 80% by volume of the concrete. In ultra-high performance concrete, the aggregate can be less than 70% of the concrete by volume. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more. In particular, ultra-high performance concrete, concrete panels or concrete elements with compressive strengths of over 20,000 psi can be cast and cured using the present invention.

The aggregate used in the concrete in accordance with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof. Aggregates that may have been subjected to a carbonation process prior to mixing with cement, pozzolan and water may also be used in the mixes above. In particular, recycled aggregates that may have been or not subjected to a carbonation process prior to mixing with cement, pozzolan and water can be used in the mixes above.

The reinforcement of the concrete in accordance with the present invention is not a critical aspect of the present invention, and, thus, any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement. Portland cement may contain various amounts of ground limestone depending on the type of cement, code approval, local jurisdiction and application, anywhere from less than 5% and up to 40%. The cementitious material preferably comprises a reduced amount of portland cement and an increased amount of supplementary cementitious materials; i.e., hyaloclastite, volcanic ash or pumice in according with the present invention, or mixtures thereof in accordance with the present invention. This results in cementitious material and concrete that is more environmentally friendly. The portland cement can also be replaced, in whole or in part, by one or more pozzolanic materials. Portland limestone cement is a designation known to those skilled in the art for portland cement with ground limestone content of greater than 5%. Portland cement is a hydraulic cement. Hydraulic cements harden because of a hydration process; i.e., a chemical reaction between the anhydrous cement powder and water. Thus, hydraulic cements can harden underwater or when constantly exposed to wet weather. The chemical reaction results in hydrates that are substantially water-insoluble and so are quite durable in water. Other hydraulic cements useful in the present invention include, but are not limited to, calcium aluminate cement, belite cement (dicalcium silicate), phosphate cements and anhydrous gypsum. However, the preferred hydraulic cement is portland cement.

In a disclosed embodiment of the present invention, concrete or mortar comprises a hydraulic cement, hyaloclastite, volcanic ash or pumice or mixtures thereof in accordance with the present invention, aggregate and water. Preferably, the cementitious material used to form the concrete or mortar comprises portland cement and hyaloclastite, volcanic ash or pumice powder or mixtures thereof, more preferably portland cement and hyaloclastite, volcanic ash or pumice or mixtures thereof having a volume-based mean particle size of less than or equal to approximately 40 μm, most preferably portland cement and hyaloclastite, volcanic ash or pumice or mixtures thereof having a volume average particle size of less than or equal to approximately 20 μm, especially less than or equal to approximately 15 μm, more especially less than or equal to approximately 10 μm, most especially less than or equal to approximately 5 μm. The foregoing ranges include all of the intermediate values. In simple terms, the hyaloclastite, volcanic ash or pumice or mixtures thereof is reduced to a fine powder such that the fine powder has pozzolanic properties.

In another disclosed embodiment of the present invention, concrete including hyaloclastite, volcanic ash or pumice or mixtures thereof in accordance with the present invention can include any other pozzolan in combination with hydraulic cement.

The portland cement and volcanic ash or pumice or mixtures thereof in accordance with the present invention can be combined physically or mechanically in any suitable manner and is not a critical feature of the present invention. For example, the portland cement and hyaloclastite, volcanic ash or pumice or mixtures thereof in accordance with the present invention can be mixed together to form a uniform blend of dry cementitious material prior to combining with the aggregate and water. Or, the portland cement and hyaloclastite, volcanic ash or pumice or mixtures thereof in accordance with the present invention can be added separately to a conventional concrete mixer, such as a transit mixer of a ready-mix concrete truck, at a batch plant. The water and aggregate can be added to the mixer before the cementitious material; however, it is preferable to add the cementitious material first, the water second, the aggregate third and any makeup water last.

In a disclosed embodiment of the present invention, $CO_2$ can be combined with hyaloclastite, volcanic ash or pumice or mixtures thereof in accordance with the present invention in any manner known in the prior art for sequestering $CO_2$ in concrete; see for example U.S. Pat. Nos. 10,246,379; 10,350,787; 10,570,064 and 10,654,191 (the disclosures of which are all incorporated herein by reference). For example, a slurry of water and hyaloclastite, volcanic ash or pumice or mixtures thereof in accordance with the present invention can be formed and $CO_2$ can be bubbled through the slurry at atmospheric pressure or at elevated pressure, such that the $CO_2$ goes into solution in the water. In another disclosed embodiment of the present invention, a concrete mix can be formed by combining portland cement, hyaloclastite, volcanic ash or pumice or mixtures thereof in accordance with present invention, aggregate and water. $CO_2$ can then be injected into the concrete mix at atmospheric pressure or at elevated pressures, at ambient temperature or at elevated temperatures. In another disclosed embodiment of the present invention, hyaloclastite, volcanic ash or pumice or mixtures thereof in accordance with the present invention; i.e., in powder form, is exposed to $CO_2$ at atmospheric pressure or at elevated pressures, at ambient temperature or at elevated temperatures. In another disclosed embodiment of the present invention, $CO_2$ can be injected into water under pressure so that the $CO_2$ goes into solution in the water, thereby forming carbonated water. Methods of forming carbonated water are well known in the prior art. The carbonated water is then combined with the components that form concrete or mortar containing hyaloclastite, volcanic ash or pumice or mixtures thereof in accordance with the present invention. The carbonated water can be combined with the components that form concrete or mortar containing hyaloclastite, volcanic ash or pumice or mixtures thereof in accordance with the present invention at atmospheric pressure or at elevated pressure and at ambient temperature or at elevated temperature.

The $CO_2$ can be injected into a mixture of any one or more of the components of a concrete or mortar formulation plus hyaloclastite, volcanic ash or pumice or mixtures thereof in accordance with the present invention and the method of injection can be any means known in the prior art used with other cementitious compositions. In other words, the present invention does not necessarily utilize a novel form or method for injecting $CO_2$, except as specifically described herein, but, rather, comprises a novel composition that will reacted with $CO_2$ at a higher rate and/or in a greater amount per unit volume of the absorbing composition. That is, the hyaloclastite, volcanic ash or pumice or mixtures thereof in accordance with the present invention will react better with $CO_2$ and therefore when the pozzolan of the present invention is incorporated into concrete or mortar mixes, such mixes will sequester more carbon than prior art cementitious compositions. Therefore, prior art methods of injecting $CO_2$ into cementitious compositions for the purpose of sequestering carbon therein can be used as a part of the present invention.

Chemical admixtures can also be used with the concrete in accordance with the present invention. Such chemical admixtures include, but are not limited to, accelerators, retarders, air entrainments, plasticizers, superplasticizers, coloring pigments, corrosion inhibitors, bonding agents and pumping aid.

Mineral admixtures can also be used with the concrete in accordance with the present invention. Although mineral admixtures can be used with the concrete of the present invention, it is believed that mineral admixtures are not necessary. However, in some embodiments it may be desirable to include a water reducing admixture, such as a superplasticizer.

Concrete can also be made from a combination of portland cement and pozzolanic material or from pozzolanic material alone. There are a number of pozzolans that historically have been used in concrete. A pozzolan is a siliceous or siliceous and aluminous material which, in itself, possesses little or no cementitious value but which will, in finely divided form and in the presence of water, react chemically with calcium hydroxide or other reactive hydroxide groups at ordinary temperatures to form compounds possessing cementitious properties (ASTM C618). The broad definition of a pozzolan imparts no bearing on the origin of the material, only on its capability of reacting with calcium hydroxide or other reactive hydroxide groups and water. The general definition of a pozzolan embraces a large number of materials, which vary widely in terms of origin, composition and properties. The most commonly used pozzolans today are industrial by-products, such as slag cement (ground granulated blast furnace slag), fly ash, silica fume from silicon smelting, and natural pozzolans such as highly reactive metakaolin, and burned organic matter residues rich in silica, such as rice husk ash.

Hyaloclastite, volcanic ash or pumice in accordance with the present invention are natural pozzolans. They can be used as a substitute for any other pozzolan or in combination with any one or more pozzolans that are used in combination with any hydraulic cement used to make concrete or mortar.

It is specifically contemplated as a part of the present invention that concrete formulations including hyaloclastite, volcanic ash or pumice or mixtures thereof in accordance with the present invention can be used with concrete forms or systems that retain the heat of hydration to accelerate the curing of the concrete. Therefore, in another disclosed embodiment of the present invention, concrete in accordance with the present invention can be cured using concrete forms such as disclosed in U.S. Pat. Nos. 8,555,583; 8,756,890; 8,555,584; 8,532,815; 8,877,329; 9,458,637; 8,844,227 and 9,074,379 (the disclosures of which are all incorporated herein by reference); published patent application Publication Nos. 2014/0333010; 2014/0333004 and 2015/0069647 (the disclosures of which are all incorporated herein by reference) and U.S. patent application Ser. No. 15/418,937 filed Jan. 30, 2017 (the disclosure of which is incorporated herein by reference).

As used herein, the term "exposed" to $CO_2$ or "injected" means $CO_2$ in gaseous, solid or liquid form. In gaseous form, the $CO_2$ is in a concentrated form; i.e., at a concentration higher than found in air at standard temperature and pressure or greater than 0.04% by weight as of the filing date of the present application; preferably 10% to 100% $CO_2$. The foregoing range includes all of the intermediate values.

All percentages used herein are percent by weight unless specifically stated otherwise.

The following examples are illustrative of selected embodiments of the present invention and are not intended to limit the scope of the invention.

Example 1

Hyaloclastite having basaltic chemistry is processed through the processing plant shown in FIG. 1. The unprocessed hyaloclastite having a moisture content of 10% is dried in the dryer 14 to a moisture content of 1%. The dried hyaloclastite is ground in the micronizing mill or ball mill 18 and classifier 22 to a volume-based mean particle size of 8 µm. The dried and ground hyaloclastite is transported from the classifier 22 to the storage silo 26 using an enclosed screw conveyor 26. The screw conveyor 22 is equipped with a plurality of nozzles (not shown) for introducing a gas under pressure to the hyaloclastite as it moves down the length of the screw conveyor. Pure $CO_2$ at a pressure of 40 psi is introduced into the screw conveyor as the dried and ground hyaloclastite moved from the classifier 22 to the storage silo 26. The screw conveyor 22 moves the material through the hyaloclastite through the tube at a speed and the tube has a length such that the residence time of the hyaloclastite in the screw conveyor is five minutes. At least a portion of the hyaloclastite delivered to the storage silo 26 has $CO_2$ adsorbed on the surface of the particles thereof and/or absorbed into the particles thereof and/or reacted on the surface thereof.

Example 2

Hyaloclastite is processed in the same manner as described in Example 1 above, except that soy protein is added to the hyaloclastite in the micronizing mill or ball mill 18. At least a portion of the hyaloclastite delivered to the storage silo 26 has $CO_2$ adsorbed on the surface of the particles thereof and/or reacted on the surface thereof.

Example 3

Hyaloclastite is processed in the same manner as described in Example 1 above, except $CO_2$ gas is not introduced into the screw conveyor 22. Carbon nanotubes having a diameter of approximately 2 nm are exposed in a chamber to pure $CO_2$, such that the carbo nanotubes adsorb $CO_2$ on the surface thereof. The carbon nanotubes embedded with $CO_2$, are blended with the hyaloclastite in the screw conveyer 22 then placed in the storage silo 26.

Example 4

Hyaloclastite is processed in the same manner as described in Example 1 above, except $CO_2$ gas is not introduced into the screw conveyor 22. Hyaloclastite is taken from the storage silo 26 and transported by rail to a precast concrete plant. The hyaloclastite is blended with portland cement, aggregate and water to form plastic concrete. During the blending process, $CO_2$ in gas or solid form (i.e., dry ice) is blended with the concrete mix. The plastic concrete is placed in a mold in a concrete curing chamber. $CO_2$ gas and steam are introduced into the concrete curing chamber. The concrete is retained in the curing chamber for 24-48 hours. $CO_2$ is sequestered in the cured concrete.

Example 5

Hyaloclastite is processed in the same manner as described in Example 2 above. The hyaloclastite is removed from the storage silo 26 and blended with portland cement, aggregate and water to form plastic concrete. The plastic concrete is placed in a conventional mold and cured. At least a portion of the $CO_2$ adsorbed on the hyaloclastite is sequestered within the cured concrete.

Example 6

Hyaloclastite is processed in the same manner as described in Example 3 above. The combination of the carbon nanotubes and hyaloclastite from the storage silo 26 is blended with portland cement, aggregate and water to form plastic concrete. The plastic concrete is placed in a mold and cured. The $CO_2$ adsorbed on the carbon nanotubes is sequestered within the cured concrete.

Example 7

Hyaloclastite is processed in the same manner as described in Example 6 above, except the mold is an insulated concrete form of the design disclosed in U.S. Pat. No. 10,280,622 (the disclosure of which is incorporated herein by reference in its entirety).

Example 8

Hyaloclastite is processed in the same manner as described in Example 1 above, except $CO_2$ gas is not introduced into the screw conveyor 22. Hyaloclastite is taken from the storage silo 26 and transported by rail to a precast concrete plant. The hyaloclastite is blended with portland cement, aggregate and water to form plastic concrete. The plastic concrete is placed in a mold in a concrete curing chamber. $CO_2$ gas and steam are introduced into the concrete curing chamber. The concrete is retained in the curing chamber for 24-48 hours. $CO_2$ is sequestered in the cured concrete.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of mineralizing carbon dioxide comprising:
providing hyaloclastite wherein the hyaloclastite is basaltic hyaloclastite, intermediate hyaloclastite or combinations or mixtures thereof and wherein the hyaloclastite has a volume-based mean particle size of less than or equal to approximately 40 μm;
combining the hyaloclastite with a hydraulic cement; and
exposing the hyaloclastite and hydraulic cement to carbon dioxide in gaseous, liquid or solid form, wherein the carbon dioxide in gaseous form is at a concentration greater than its atmospheric concentration.

2. The method of claim 1, wherein the carbon dioxide in gaseous form is at a concentration of approximately 10% to 100% by weight.

3. The method of claim 1, wherein the hyaloclastite has a volume-based mean particle size of less than or equal to 20 μm.

4. The method of claim 3, wherein the carbon dioxide in gaseous form is at a concentration of approximately 10% to 100% by weight.

5. The method of claim 1, wherein the hyaloclastite has a volume-based mean particle size of less than or equal to 10 μm.

6. The method of claim 5, wherein the carbon dioxide in gaseous form is at a concentration of approximately 10% to 100% by weight.

7. The method of claim 1, wherein the hyaloclastite has a volume-based mean particle size of less than or equal to 5 μm.

8. The method of claim 7, wherein the carbon dioxide in gaseous form is at a concentration of approximately 10% to 100% by weight.

9. The method of claim 1, wherein the combined hyaloclastite and hydraulic cement are exposed to carbon dioxide at an elevated temperature.

10. The method of claim 9, wherein the carbon dioxide in gaseous form is at a concentration of approximately 10% to 100% by weight.

11. The method of claim 1, wherein the hydraulic cement is portland cement.

12. The method of claim 11, wherein the carbon dioxide in gaseous form is at a concentration of approximately 10% to 100% by weight.

13. The method of claim 1 further comprising combining the hyaloclastite and hydraulic cement with aggregate and water to form plastic concrete.

14. The method of claim 13, wherein the carbon dioxide in gaseous form is at a concentration of approximately 10% to 100% by weight.

* * * * *